US012684400B2

(12) United States Patent　　　　　(10) Patent No.:　US 12,684,400 B2
　Saatchi et al.　　　　　　　　　　　　(45) Date of Patent:　Jul. 14, 2026

(54) JOINT SELECTION OF PARAMETER VALUES FOR WIRELESS TRANSMISSION

(71) Applicant: UVic Industry Partnerships Inc., Victoria (CA)

(72) Inventors: Negin Sadat Saatchi, Victoria (CA); Hong-Chuan Yang, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 389 days.

(21) Appl. No.: 18/198,142

(22) Filed: May 16, 2023

(65) Prior Publication Data

US 2024/0388951 A1　　Nov. 21, 2024

(51) Int. Cl.
　H04W 28/02　　　(2009.01)
　H04L 1/08　　　　(2006.01)
　H04W 24/08　　　(2009.01)
　H04W 28/06　　　(2009.01)

(52) U.S. Cl.
　CPC ........... H04W 28/0236 (2013.01); H04L 1/08 (2013.01); H04W 24/08 (2013.01); H04W 28/06 (2013.01)

(58) Field of Classification Search
None
See application file for complete search history.

(56) References Cited

U.S. PATENT DOCUMENTS

| | | | | |
|---|---|---|---|---|
| 6,978,143 | B1 * | 12/2005 | Vialen ................... | H04W 28/18 455/452.2 |
| 11,330,466 | B2 | 5/2022 | Kim et al. | |
| 11,483,810 | B2 | 10/2022 | Zhang et al. | |
| 2018/0035488 | A1 * | 2/2018 | Yang ................... | H04W 74/006 |
| 2018/0145818 | A1 * | 5/2018 | Choi ..................... | H04L 5/023 |
| 2019/0364553 | A1 * | 11/2019 | Ko ..................... | H04W 72/1273 |
| 2020/0374898 | A1 * | 11/2020 | Lin ....................... | H04L 5/0064 |
| 2021/0184787 | A1 * | 6/2021 | Iwabuchi .............. | H04L 1/0017 |
| 2024/0114429 | A1 * | 4/2024 | Morte Palacios ... | H04W 40/023 |

FOREIGN PATENT DOCUMENTS

WO　　WO-2019186957 A1 * 10/2019　............ H04W 28/18

OTHER PUBLICATIONS

English translation of WO2019186957. (Year: 2025).*
ETSI, "5G; NR; Physical layer procedures for data (3GPP TS 38.214 version 15.9.0 Release 15)," Apr. 2020, pp. 1-108 available from https://www.etsi.org/deliver/etsi_ts/138200_138299/138214/15.09.00_60/ts_138214v150900p.pdf.

(Continued)

*Primary Examiner* — Peter P Chau

(74) *Attorney, Agent, or Firm* — Klarquist Sparkman, LLP

(57)　　　　　　ABSTRACT

Methods and apparatus are disclosed for wireless transmission of a data packet. An optimization problem is formulated—based on channel condition, latency requirement, and/or packet size—and solved to jointly determine values of multiple transmission parameters such as slot size, subcarrier spacing, modulation scheme, or coding rate. Dynamic programming can solve the problem efficiently. Retransmission is supported. Reliability can be maximized subject to a latency constraint, to provide ultra-reliable low-latency communication. Variations, results, and applications are presented.

18 Claims, 9 Drawing Sheets

(56) References Cited

OTHER PUBLICATIONS

Goldsmith et al., "Variable-Rate Variable-Power MQAM for Fading Channels," *IEEE Transactions On Communications*, vol. 45, No. 10, pp. 1218-1230 (Oct. 1997).

Leite et al., "A Flexible Framework based on Reinforcement Learning for Adaptive Modulation and Coding in OFDM Wireless Systems," *IEEE Wireless Communications and Networking Conference: PHY and Fundamentals*, pp. 809-814 (Apr. 2012).

Li et al., "Deep Reinforcement Learning for Resource Management in Network Slicing," *IEEE Access*, vol. 6, pp. 74429-74441 (Nov. 2018).

Mashhadi et al., "Deep Reinforcement Learning Based Adaptive Modulation With Outdated CSI," *IEEE Communication Letters*, vol. 25, No. 10, pp. 3291-3295 (Oct. 2021).

Mota et al., "Adaptive Modulation and Coding based on Reinforcement Learning for 5G Networks," *IEEE Globecom Workshops (GC Wkshps)*, 6 pages (Dec. 2019).

Patriciello et al., "5G New Radio Numerologies and their Impact on the End- to-End Latency," *IEEE 23rd International Workshop on Computer Aided Modeling and Design of Communication Links and Networks (CAMAD)*, 6 pages (Sep. 2018).

Praveen et al., "Reinforcement Learning Based Link Adaptation in 5G URLLC," *8th International Conference on Smart Computing and Communications (ICSCC)*, pp. 159-163 (Jul. 2021).

Saatchi et al., "Novel Adaptive Transmission Scheme for Effective URLLC Support 5G NR: A Model-Based Reinforcement Learning Solution," *IEEE Wireless Communications Letters*, vol. 12, No. 1, pp. 109-113 (Nov. 2022).

Segura et al., "5G Numerologies Assessment for URLLC in Industrial Communications," *Sensors*, pp. 1-11 (Apr. 2021).

Yang et al., "Data-Oriented Transmission in Future Wireless Systems," *IEEE Vehicular Technology Magazine*, pp. 78-83 (Jul. 2019).

* cited by examiner

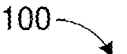
100
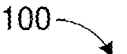
FIG. 1

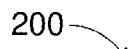

200

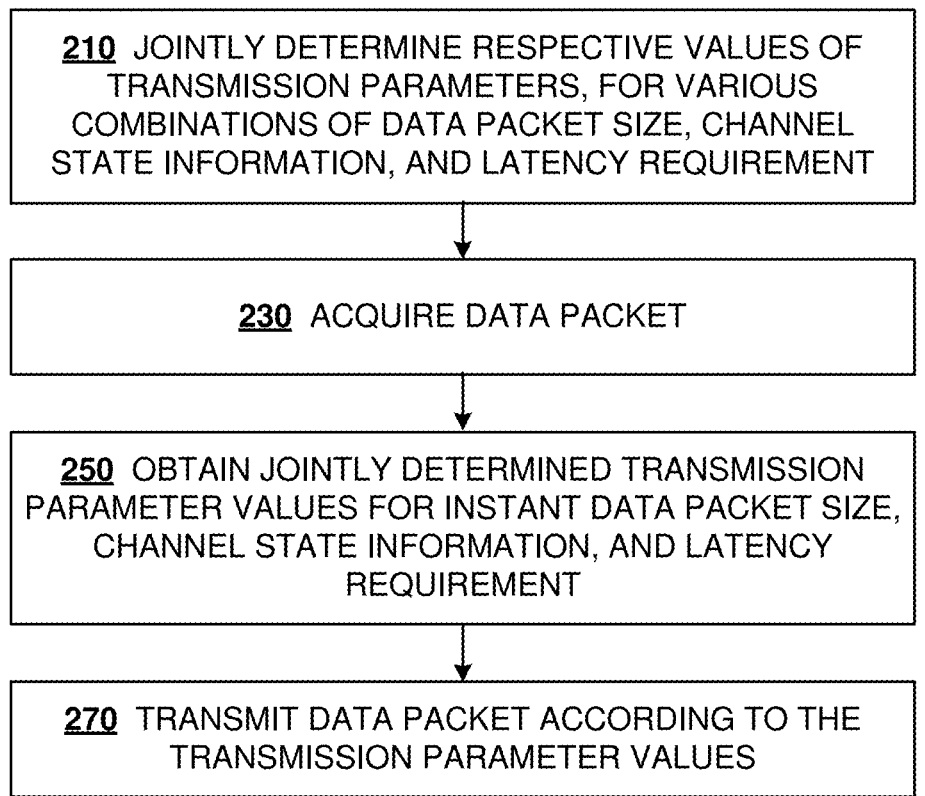

210 JOINTLY DETERMINE RESPECTIVE VALUES OF TRANSMISSION PARAMETERS, FOR VARIOUS COMBINATIONS OF DATA PACKET SIZE, CHANNEL STATE INFORMATION, AND LATENCY REQUIREMENT

230 ACQUIRE DATA PACKET

250 OBTAIN JOINTLY DETERMINED TRANSMISSION PARAMETER VALUES FOR INSTANT DATA PACKET SIZE, CHANNEL STATE INFORMATION, AND LATENCY REQUIREMENT

270 TRANSMIT DATA PACKET ACCORDING TO THE TRANSMISSION PARAMETER VALUES

Computing Cloud 1290

Software 1280 for described technologies

Computing Environment 1210

1220

1222
Processing Unit

1224
Memory

Communication Port(s) 1270

Input Device(s) 1250

Output Device(s) 1260

Graphics or Co-processor 1230

Storage 1240

Software 1280 for described technologies

JOINT SELECTION OF PARAMETER VALUES FOR WIRELESS TRANSMISSION

BACKGROUND

High reliability and low latency have long been aspirational goals of wireless communication. However, the reliability and latency requirements for dominant wireless applications (e.g. voice, messaging, streaming media) are modest. Unsurprisingly, legacy wireless standards have not been well suited to much more stringent reliability and latency requirements of emerging applications such as networks of self-driving cars. Newer wireless standards provide some facilities that can support ultra-reliable low-latency communications. However, conventional approaches have been limited in the reliability and latency achieved. Accordingly, there remains a need for improved technologies to provide reliable low-latency wireless communication.

SUMMARY

In brief, the disclosed technologies provide joint determination of values of two or more wireless transmission parameters to maximize the likelihood of successful transmission of a data packet within a latency budget. The joint determination can be made based on factors such as data packet size, channel conditions, or latency budget. Exemplary transmission parameters whose values can be jointly determined include subcarrier spacing, slot size, modulation scheme, or coding rate. Retransmissions within a latency budget can be supported, with same or updated transmission parameter values as an initial transmission. A single transmitter can support multiple concurrent data streams.

Results of modeling show markedly improved performance over comparative techniques—a factor of 10 or greater reduction in packet loss rate, 40% reduction in latency, or 3 dB reduction in required SNR.

The foregoing and other objects, features, and advantages of the invention will become more apparent from the following detailed description, which proceeds with reference to the accompanying figures.

BRIEF DESCRIPTION OF THE DRAWINGS

FIG. 1 is a diagram illustrating a state space of an example problem formulation for the disclosed technologies.

FIG. 2 is a flowchart of a first example method according to the disclosed technologies.

DETAILED DESCRIPTION

Introduction

Figure 3:
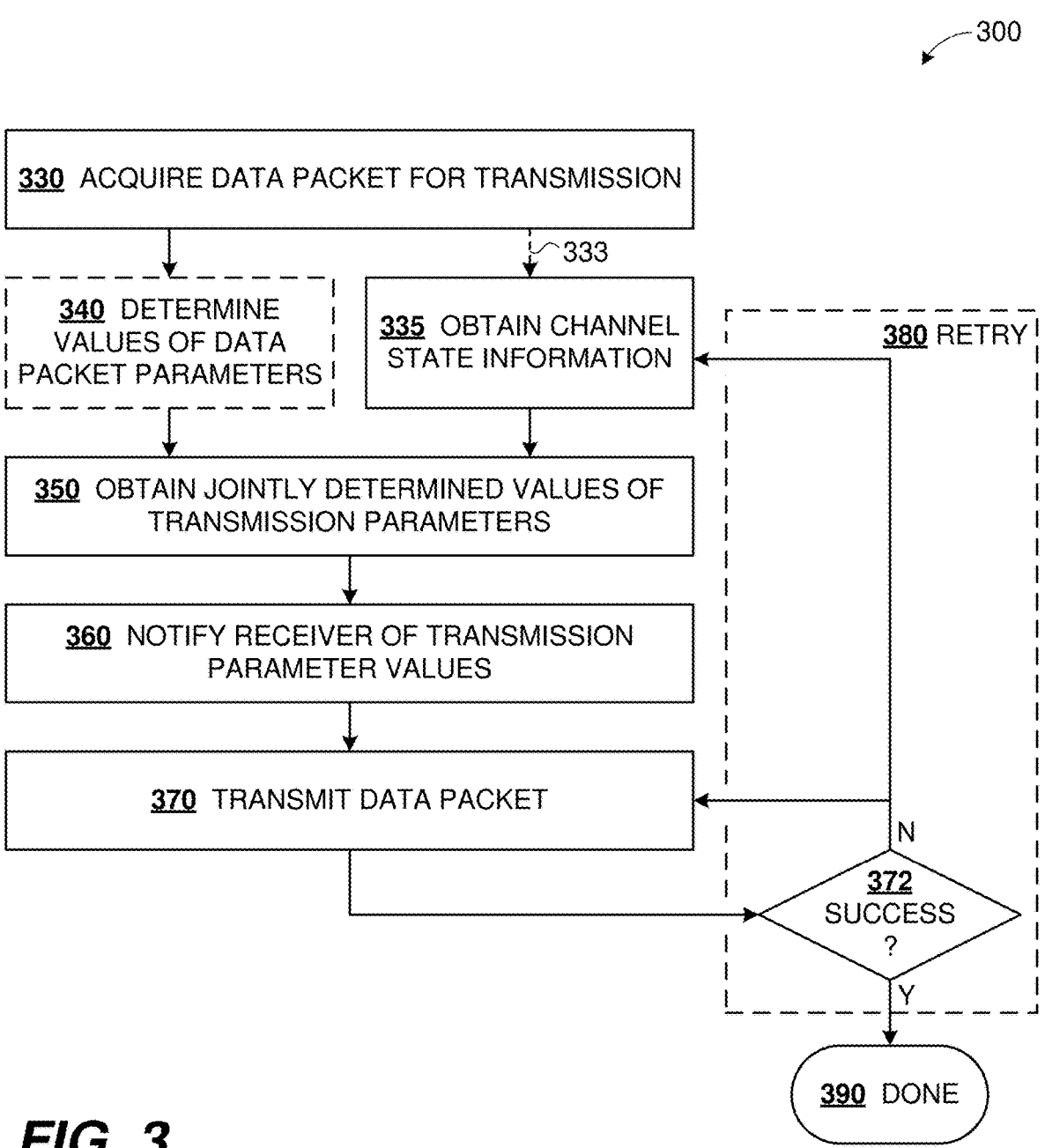
FIG. 3 is a flowchart of a second example method according to the disclosed technologies.

Wireless communication applications such as self-driving vehicles or remote control of equipment require very low latency service combined with very high reliability. Latency around 1 ms can be desirable, which is much more stringent than the requirement for voice, for which latencies around 100 ms are acceptable. (Other wireless uses such as streaming media can implement buffering and can tolerate even longer latencies, measured in seconds.)

At the same time, signal drops (e.g. packet loss) in voice or streaming media are merely nuisances, often tolerable, and may not even be noticed at all. But for critical applications, packet loss can lead to vehicle accidents or mission failure. Reliability requirements for such applications is typically about "five nines" or 99.999%, and desirably even higher.

Because these requirements are challenging, such applications have hitherto struggled with earlier wireless technologies. More recently, in recognition of the special needs of these applications, the so-called 5G New Radio standard has incorporated a 5G Ultra-Reliable Low-Latency Communication (URLLC) service. Particularly, URLLC offers flexible control of wireless transmission parameters, allowing values of parameters such as subcarrier spacing, slot length, modulation scheme, or coding rate to be varied from one time slot to the next, without waiting for radio reconfiguration. This offers an opportunity to select and vary transmission parameter values according to rapidly evolving channel conditions—selecting one set of optimized transmission parameter values for one data packet, and selecting a different set of optimized transmission parameter values for a next data packet.

The 5G standards do not presently specify how the transmission parameter values are to be determined, leaving it to the implementation. The present disclosure is directed to innovative techniques for joint optimization of multiple transmission parameters, and can provide dramatically superior performance than known techniques of adaptive modulation and coding (AMC), even aided by reinforcement learning. The joint optimization disclosed herein is different from successive optimization of individual parameters, which can find local 1-dimensional (1-D) maxima in a multi-dimensional performance space (e.g. performance as a function of multiple controllable transmission parameters) but can completely miss a superior global maximum in two, three, or more dimensions. The joint optimization disclosed herein also differs from heuristic approaches which can apply rules to pick transmission parameter values without regard to whether better combinations of values of the transmission parameters may be available.

The disclosed technologies can also employ retransmission more effectively than conventional techniques. As a simplified illustration, given a latency window tL for which a single transmission offers reliability of four nines (99.99%) with optimal transmission parameter values, the disclosed technologies can recognize that optimal transmission parameter values can achieve three nines (99.9%) in a window of tL/2, and that retransmission can be performed in a second window of length tL/2, yielding an overall reliability of about six nines (99.9999%), within the latency budget tL.

Terminology

The usage and meaning of all quoted terms in this section applies throughout this disclosure unless clearly indicated otherwise or repugnant to the context. The terminology below extends to related word forms.

An "acknowledgement" is a message indicating that another communication was received. In examples, a receiver can send an acknowledgement confirming receipt of a transmission from a transmitter. In examples, the acknowledgement can indicate whether the communication was received successfully or with error. To illustrate, the receiver can evaluate a predetermined checksum formula over a received communication, and compare it with a corresponding checksum included within the communication. A match indicates, with a high degree of probability, that the communication was successfully received, while a discrepancy indicates an error over the communication link. In varying examples, the acknowledgement can be sent over the same channel as the original communication, over a paired reverse channel, or out-of-band over a different communication link. In variations, an absence of an acknowledgment can be treated as a failure of the corresponding data transmission. In further variations, acknowledgments can be sent only in case of a failure detected by the receiver, similar to an automatic repeat request (ARQ) protocol.

"Channel state information" (or "CSI") refers to information characterizing a communication channel between a transmitter and its intended receiver, in particular the channel over which a data packet is to be sent. Examples of CSI include a signal-to-noise ratio (SNR), a signal-to-noise-plus-interference-ratio (SINR), dispersion between subcarriers, attenuation variation between subcarriers, or a parameter indicating stability or rate of change of any of these parameters. In some examples, CSI can be measured at the receiver (e.g. from a prior signal) and notified to the transmitter, e.g. over a control channel from the receiver to the transmitter. To illustrate, noise level can be determined using a resource block (e.g. a time slot on a particular channel or subcarrier) in which no signal is transmitted. Signal level can be determined using a known received signal, such as a sounding reference signal (SRS). Then, the ratio of signal level to noise level yields the SNR of the channel. The term SNR is used herein for conciseness of description, but is understood to encompass SINR.

"Coding" and "coding rate" refer to incorporation of forward error correction (FEC) (e.g. low-density parity check (LDPC) codes, Reed-Solomon codes, or other checksums) in the transmitted data symbols. To illustrate, if 12 source data bits are appended with 3 check bits to transmit 12+3=15 bits, then the coding rate can be defined as 12/15=0.8. A higher order coding scheme or lower coding rate can increase reliability, at a cost in data rate because of the FEC overhead.

A "communication channel" (or, simply "channel") is a path between two or more communicating devices, or a subset thereof. In varying examples, a communication channel can be: a spatial region between a transmitter and a receiver through which a wireless signal is transmitted, with or without scattering by objects in the region; a frequency band within that region; a further subdivision of the spatial region or frequency band based on one or more of time division, code division, frequency division (e.g. subcarriers), frequency hopping, spatial division (e.g. with spatial division multiplexing), or another channel partitioning scheme. In a communication link, some one or more channels can be used for data transmission, while another one or more channels can be used as control channels or for other functions of an applicable protocol or standard. A "control channel" can be defined as a particular time bin and/or a particular frequency bin according to a governing communication standard. Examples of the disclosed technology can use control channels for notifying a receiver of values of flexible transmission parameters, or for acknowledging receipt of a wireless transmission.

A "communication protocol" (or, simply "protocol") is a set of rules for compatible communication between two or more devices. Some protocols of interest herein can include certain aspects (e.g. a particular standard to be followed) which can be pre-configured or which can be negotiated between networked devices such as a transmitter and receiver. Other parameters of a protocol can be determined during operation, e.g. as flexible parameters, which can be notified from a transmitter to its intended receiver(s).

A "constraint" is a requirement that an associated parameter take on only a limited set of values (or, just a single value) among all possible values. Constraints can arise from application requirements, a standard, a regulation, or an equipment limitation. For example, latency can be constrained to be at most 1 ms. As another example, a slot size in a 5G New Radio can be constrained to be selected from {2, 4, 7, 14}. As further examples, transmit power can be limited to +20 dBm by regulatory requirement or +10 dBm by transmitter capability.

The unqualified term "data" refers to baseband information of a communication. Generally, data at a transmitter is encoded as a signal and transmitted while, at a receiver, a signal is received and decoded to recover data.

A "data packet" is a finite data item that can be provided as a unit to a transmitter or provided as a unit from a receiver. Within the transmitter, receiver, and a wireless link between them, the data packet can be variously transformed by encoding, modulating, demodulating, decoding and associated operations. Often, a protocol layer stack is used, and as a data packet is passed from higher to lower protocol layer (e.g. at a transmitter), the data packet can be encapsulated within one or more lower layer protocol data units (PDUs). In varying examples, one data packet can be split among multiple lower layer PDUs, multiple data packets can be aggregated within a single lower layer PDU, or there can be a one-to-one correspondence between a data packet and the lower layer PDU. Converse operations can be performed at the receiver. A data packet can have a "type", according to a classification of the information represented therein. To illustrate, in a vehicle application, camera and lidar sensors can generate distinct types of data packets.

A transmitter can decide not to transmit a given data packet even if the data packet has not been successfully transmitted, and this act of deciding is dubbed "discarding" the data packet. In some examples, a data packet can be discarded if its latency window has expired, at which point the data packet has ceased to have value to any destination component, and the data packet is "stale". Upon discard, memory in which a discarded data packet had been stored can be marked as empty or available.

"Dynamic programming" is a technique for breaking down a computational problem into smaller, more readily tractable parts. This technique is advantageous for a wide range of problems, including Markov decision processes (MDP), because the collection of smaller problems can be solved more efficiently (less utilization of computing resources) than the original problem. Dynamic programming can be applied recursively.

A "Markov decision process" (or "MDP") is a model of an optimization problem, combining (i) randomized steps between successive candidate solutions to the optimization problem with (ii) a decision metric which indicates how good a current solution is.

The term "flexible" refers to transmission parameters whose values can be selectably changed on an individual slot basis or an individual data packet basis, sometimes dubbed "on the fly". That is, a flexible transmission parameter can be modified from a first value to a second value without incurring a penalty of lost transmission time, compared to continuing transmission with the first value. In contrast, a wireless communication implementation which operates in one mode and then can be reconfigured to another mode may incur an overhead while radios undergo reconfiguration and accordingly is not considered to be flexible. Further, wireless communication in which a channel is shared between two streams, each employing different transmission parameters, may or may not support flexible transmission parameters, depending on whether a given one of the streams can switch transmission parameter values on the fly. A wireless communication standard or implementation can support a mix of flexible and inflexible parameters. In varying embodiments, a value of the flexible transmission parameter can be notified to an intended receiver within the associated transmission, or can be provided in a parallel communication channel such as a control channel.

The term "industrial automation" refers to equipment operable under program control in an industrial setting. Non-limiting examples of industrial environments include: a manufacturing plant, a utility plant, a chemical or other processing plant, a warehouse or freight handling facility, a mine, a farm or other agricultural facility, or a repair or other service facility. Increasingly, automated equipment in industrial environments are linked wirelessly with each other or with a control station.

An "Internet of Things" (IoT) refers to a network of devices connected via an internetworking protocol, and can include devices having physical world functionality beyond that of a general purpose computer or communication terminal. Each such device is termed an "IoT device". An IoT can also include general purpose computers or communication terminals which are not IoT devices. While an IoT can include or connect to the public Internet, this is not a requirement, and an IoT can be isolated (e.g. at one site) with no connectivity to the public Internet. In further examples, an IoT can be connected as a virtual private network (VPN) over another network such as the public Internet or a telephony network. Some IoT devices can have device specific annunciators or user keys, without any general purpose display or keypad. Other IoT devices can lack any annunciators or user controls, or can have a single status indicator, being managed by a remote host terminal over an IoT. IoT devices encompass sensors, actuators, and multifunction devices. An IoT device can incorporate multiple components such as a radio transmitter, a controller, a source component, or a destination component.

Two actions are considered to be performed "jointly" if they overlap in time. That is, each action commences before the other has completed. Similarly, the "joint determination" of two or more values (e.g. values of respective transmission parameters) refers to such determination being performed concurrently and not sequentially. That is, determination is performed through common acts, or through respective acts which overlap in time.

As used herein, "latency" refers to the elapsed time from arrival of a data packet at a transmitter to completion of transmission of the data packet from the transmitter. This is a transmitter-centric view of latency which does not include propagation time from transmitter to receiver, nor does it include time required to process, acknowledge, or deliver the received data packet at the receiver. (In the art, similar latencies sometimes include propagation time or receiver processing time; or are sometimes defined as an application-centric latency from a source component upstream of the transmitter, at which information within the data packet is produced, to a destination component downstream of the transmitter, at which that information is consumed. However, those definitions differ from the transmitter-centric "latency" used in this disclosure.) A given data packet can have an actual latency, which can be constrained according to the application to be less than or equal to a predetermined limit, known as a "latency requirement", "maximum latency", or "latency budget". In some examples, the latency requirement can be 1 ms, or another value in a range 100 μs to 10 ms, 10 μs to 100 ms, or 1 μs to 1 s. A "latency window" is a specific period of time between arrival of a data packet at the transmitter and expiration of the maximum latency counting from that arrival.

A "medium" is a spatial extent over which communication signals can propagate. A common medium for disclosed examples is air, however this is not a requirement, and the disclosed technologies can be applied in environments where all or part of the medium is liquid (e.g. underwater), solid (e.g. for propagation of acoustic signals), vacuum (e.g. in space), or an inhomogeneous combination thereof. While many common media contain matter, this is not a requirement, and vacuum can also be a medium. The common term "on-air" is used broadly herein to characterize signals propagating in a medium and does not imply that the medium is "air." The terms "wireless transmission resource" (or simply, "wireless resource") refer to the capacity of a medium to transmit communication signals. A wireless resource can be partitioned by frequency bin, time slot, spreading codeword, or other attributes to provide a diversity of communication channels.

"Modulation scheme" refers to how data bits or symbols are represented in a radio signal. Modulation refers to a mapping from data bits to an amplitude and phase combination of the radio signal. Example modulations include binary phase shift keying (BPSK), quadrature amplitude modulation (QAM). A higher-order modulation scheme (e.g. 256 QAM over 16 QAM) can increase data rate, at a cost in reliability since the higher order modulation offers lower SNR for given transmit power and noise levels.

A "motor vehicle" refers to an apparatus for transporting a load (e.g. one or more passengers, animate objects, and/or inanimate objects, in any combination), which contains a means of propulsion generically dubbed a "motor". Cars, buses, trucks, airplanes, and package delivery drones are all examples of motor vehicles. For example, the disclosed technologies can be used in self-driving motor vehicles.

A "parameter" is an attribute of an entity which can have a value. As an illustration, modulation scheme, coding rate, subcarrier spacing, and slot size are parameters of a wireless transmission. The value of a parameter can change. A parameter can exist even if its value is not defined. The value can be an atomic data item such as Boolean True, integer 3, float 2.22, or string "abcd"; or a complex datatype such as an array or a heterogeneous data structure. In some instances herein, and where clear from the context, the term "parameter" is used as short-hand for its "parameter value". References to determination of a parameter, and similar language, refer to determining a value for that parameter.

The terms "receive" and "transmit" refer to data communication over a wireless medium, which can be in the form of a signal. A device placing a signal on the medium is dubbed a "transmitter," while a counterpart device responding to a signal on the medium is dubbed a "receiver." In some examples, receivers or transmitters can have dedicated roles, while in other examples, receivers and transmitters can swap roles for bidirectional communication, or can otherwise mix transmit and receive operations over a same channel or over different channels. Receivers or transmitters can also communicate with other devices. In between transmissions, a transmitter or receiver can be "idle." In varying examples, an idle transmitter can have its transmitter disabled; or can transmit an identifier, a timing mark, a beacon, an unmodulated carrier wave, or other non-payload bearing transmission over the medium. A wireless transmission can be directed (e.g. by physical orientation of a radiation pattern) or addressed (e.g. by an address field included in the transmission) to one or more receivers dubbed "intended receivers" but can be detected by other receivers sharing the medium. In some examples, a transmitter may elect to transmit a data packet two or more times within its latency window, which can offer increased reliability as compared to a single transmission within the latency window. The second and any further transmissions of the data packet are termed "retransmissions". In some examples, retransmission can be performed after receiving a failure acknowledgement from the intended receiver while, in other examples, retransmission can be performed without waiting for an acknowledgment.

The term "reliability" refers to the probability of successful reception, at an intended receiver, of a data packet transmitted from a transmitter. A given data packet transmission can have a predicted reliability (in addition to a subsequently determined binary value indicating whether or not the data packet was actually received successfully). The predicted reliability can be constrained according to the application to be greater than or equal to a predetermined threshold, known as a "reliability requirement" or "minimum reliability". To illustrate, in some applications, the reliability requirement can be 99.999% ("five nines"), or another value in a range [90%, 100%), [99%, 100%), or [99.9%, 100%).

A "signal" is a manifestation of a data communication over a communication medium. In examples, the communication can be wireless and the medium can be air or a vacuum.

The term "size" refers to an amount or length of data measured in units of data. For example, the size of a data packet can be denoted in bytes, e.g. "128 bytes". A slot of a wireless transmission can have a "slot size" denoted in symbols. For example, a slot size of 3 symbols means that a given carrier (or subcarrier) can transmit a first symbol, followed by a second symbol, followed by a third symbol, during the slot. Where multiple subcarriers are used, each subcarrier can carry up to 3 symbols during the slot. The amount of data in one symbol can be dependent on a modulation scheme, e.g. one bit for BPSK, two bits for QPSK, 8 bits for 256 QAM.

A "source component" (or "source") is an apparatus or component coupled to a transmitter, at which information contained in a data packet is originated. In examples, a source can incorporate a sensor and/or a microprocessor, but this is not a requirement. Non-limiting examples of sources include: a camera, a lidar instrument, a position sensor, a proximity sensor, a sensor of an environmental property such as temperature, pressure, noise, humidity, an RFID tag, or a status indicator. The source can be coupled to the transmitter over a bus or a local network, using a wired, optical, acoustic, or a (local) wireless connection. A "destination component" (or "destination") is an apparatus or component thereof coupled to a receiver, at which information contained in the data packet is consumed. In examples, a destination component can incorporate an actuator and/or a microprocessor, e.g. implementing a controller.

In some examples, multiple data packets arrive at the transmitter and are wirelessly transmitted, one after the other, forming a "succession" or "sequence" of data packets. Multiple data packets having some common attribute constitute a "stream" of data packets. In some examples, all data packets transmitted by a given transmitter form one stream, with the common attribute being at least the transmitter performing the transmission. In other examples, a single transmitter can transmit multiple streams. To illustrate, two streams can arrive from two distinct source components coupled to the same transmitter, such as a camera and a lidar instrument. As another illustration, a single source can generate two streams of data packets for different intended receivers. As a further illustration, the source can generate multiple streams of data packets for a single intended receiver, the streams being distinguished based on different types of data having different latency requirements for a particular application.

A "subcarrier" is a frequency bin within a frequency band, e.g. in an orthogonal frequency division multiplexing (OFDM) communication system. The center-to-center frequency spacing between two adjacent subcarriers is dubbed "subcarrier spacing", sometimes known in the art as the "numerology". Within a given frequency band, tighter subcarrier spacing means reduced bandwidth and data rate for each subcarrier, which is approximately compensated by an increased number of subcarriers within the frequency band. Conversely, wider subcarrier spacing provides increased bandwidth and data rate for each subcarrier, at a cost of fewer available subcarriers.

A "symbol" is a unit of data in a communication. The term is commonly used in context of a wireless transmission, but this is not a requirement. Exemplary symbols can include a bit, an n-bit symbol in an $2^n$-ary encoding scheme (e.g. 2 bits in quaternary amplitude phase keying (4-APK) or quadrature phase shift keying (QPSK) or 8 bits in 256-ary quadrature amplitude modulation (256-QAM)). The number of symbols transmitted per unit time in a given data stream is the "symbol rate" of the data stream. In some examples, baseband symbols correspond 1:1 with symbols transmitted or received over the air, but this is not a requirement. Some coding schemes can mix baseband symbols.

The term "transmission parameter" refers to a controllable parameter governing emission of a communication signal from a transmitter, which is independent of information content of the signal. Transmission parameters can include parameters such as modulation scheme, coding rate, subcarrier spacing, or slot size, which can be defined by a standard; or can include other parameters such as beamforming coefficients, transmit power, or polarization.

The term "wireless" refers to electromagnetic signal propagation or communication not through or guided along an electrically conductive object or an optical waveguide.

Overview

This section describes formulation of the problem and its solution in context of 5G (fifth generation) New Radio ("5G New Radio" or "5G NR"), in an example of the disclosed technologies.

Example Wireless Transmission Parameters

The 5G (fifth generation) New Radio ("5G New Radio" or "5G NR") standards have been developed by the 3rd Generation Partnership Project ("3GPP") and are now in commercial use. In addition to various modulation schemes and coding rates, 5G NR supports flexible selection of subcarrier spacing and slot length N. The subcarrier spacing is indexed by $\mu$=0 to 5. The index value corresponds to a frequency spacing $\Delta f=15 \times 2^{\mu}$ kHz between adjacent subcarriers. The time t1 required to transmit one symbol on a subcarrier is inversely proportional to the subcarrier bandwidth, or equivalently the subcarrier spacing. The slot length N represents the number of symbols transmitted on each subcarrier and can be selected from {2, 4, 7, 14}. An acknowledgement by the receiver can be performed in an additional symbol time t1. The following table lists the time duration for transmission of one symbol (t1) and for N symbols (tN), for various combinations of $\mu$ and N.

TABLE 1

| $\mu$ | tN ($\mu$s), transmission time for N symbols | | | | t1 ($\mu$s) |
| | 2 | 4 | 7 | 14 | |
|---|---|---|---|---|---|
| 0 | 142.85 | 285.71 | 500 | 1000 | 71.42 |
| 1 | 71.42 | 125 | 250 | 500 | 35.71 |
| 2 | 35.71 | 71.42 | 125 | 250 | 17.85 |
| 3 | 17.85 | 35.71 | 71.42 | 125 | 8.92 |
| 4 | 8.92 | 17.85 | 35.71 | 62.5 | 4.46 |
| 5 | 4.46 | 8.92 | 17.85 | 31.25 | 2.23 |

Some examples herein describe joint determination of the above 5G NR transmission parameters, but this is not a requirement and, in other examples, fewer, more, or different transmission parameters can be jointly determined. For example, transmission power, beam-forming parameters (e.g. beamwidth, pointing direction, or selection among fixed beams), or polarization can also be included. Alternatively, some two or more parameters can be jointly determined, while values of other parameters can be selected independently, before or after such joint determination.

Example Modeling

The disclosed technologies were evaluated by constructing and simulating a model. The model incorporates slow Rayleigh fading, with channel conditions are characterized by signal-to-noise ratio (SNR). The SNR is treated as unvarying over one data transmission, but can change from one transmission to the next. SNR variation is modeled as a Markov process, with SNR binned into a discrete set of values, and transition probabilities from one bin to an adjacent bin at each successive data transmission (e.g. each slot). Suitable bin widths can be dependent on modulation scheme and coding rate, and can be about 0.5-1 dB, 1-2 dB, 2-3 dB, 3-5 dB, or 5-10 dB in varying examples. Bit error rate (BER) can be calculated for each set of transmission parameters and SNR, and used to derive a packet error rate (PER), e.g. according to $(1-PER)=(1-BER)^n$, where n is the total number of bits in the data packet, in all subcarriers. (1-PER) is the probability of successful transmission of the data packet, which can be regarded as the predicted reliability of that transmission. Depending on coding implementation, other relationships between BER and PER can be applicable.

The model incorporates a few other considerations. First, in typical applications, processing delays (on the order of 1-10 $\mu$s) are generally shorter than transmission times (on the order of 100 $\mu$s) or latencies (on the order of 1 ms) and can be assumed to be zero in the model. Alternatively, processing delays are nearly constant, and can also be included in a model for better accuracy in cases of short time slots or multiple retransmissions. Then, flexible operation entails communication of transmission parameter values from transmitter to receiver. The selected values of the transmission parameters can be transmitted from transmitter to receiver in a control channel, parallel with the data channel, and can also be assumed not to contribute to latency. The data packet size is taken as 32 bytes, which is typical.

Example Formulation of Problem in a Two-Dimensional State Space

The problem can be stated as determination of optimum transmission parameter values to maximize the probability of successful transmission within the latency window. Multiple transmissions are allowed. This problem can be formulated as a Markov decision process (MDP) over a two-dimensional discretized state space.

FIG. 1 is a diagram 100 illustrating such a state space for an example problem formulation. A main portion of the state space is grid 110 formed by SNR bins 1-10 in one dimension and bins 1-480 denoting remaining latency in the other dimension. SNR bins have been described above and boundaries between SNR bins are indicated along the horizontal axis of grid 110. Latency can be binned in units of the smallest symbol transmission time t1: 2.23 us from Table 1. Latency bins run along the vertical axis of grid 110—because of the large number of bins, individual bin boundaries are omitted from grid 110.

Two additional states are defined in the example model, representing Success 180 and Failure 190. Success 180 can be reached at any iteration where the data packet is transmitted, with a probability equal to the best (1-PER) among permissible sets of transmission parameter values. Marker 130 indicates a state space location of a modeled system before any transmission of an acquired data packet has been made. In this illustration, the total latency budget is 600 $\mu$s, corresponding to bin 269. Because all the latency budget is available at the outset, marker 130 is positioned at latency bin 269. The initial SNR is illustratively chosen as SNR bin 3. From this initial state, a transmission can be made, say with $\mu$=1 and N=4. This transmission uses 250 $\mu$s, and its acknowledgment uses another 36 $\mu$s, leaving 600 $\mu$s–(250+36) $\mu$s=314 $\mu$s of latency budget (bin number 141) available for one or more retransmissions. Concurrently, the SNR can evolve according from its initial value to the same or an adjacent SNR bin, according to transition probabilities predefined in the model. Thus, if the transmission is not successful, state 130 can evolve to latency bin 141 and any one of SNR bins 2-4 as shown by arrows 134 and new state markers 140-142. Additional transmissions may also be possible at state 130. These are represented by short arrows 136, but are otherwise omitted from FIG. 1 for clarity of illustration.

Once again, one or more transmissions may be possible from state 140. Arrows 144 show transitions to states 150-152 from a similar 250 $\mu$s transmission as before. This time, there is only 314 $\mu$s–(250+36) $\mu$s=28 $\mu$s latency budget remaining at states 150-152, and these states immediately lead to Failure 190 via arrows 159. That is, Failure 190 is only reached when the latency budget is exhausted. In varying examples, this can occur after a single iteration, e.g. if there is no permissible set of transmission parameter values for any remaining latency budget, after two transmissions as illustrated, or after more transmissions, e.g. four successive 200 $\mu$s cycles of transmission-plus-acknowledgment (one initial transmission and three retransmissions) can exhaust an 800 μs latency budget. In some situations, e.g. with large data packet and/or low latency budget, there may be no permissible transmissions and the initial state of the system can lead directly to Failure 190 with 100% probability.

Additional transmissions and state transitions are shown by arrows 146, 148 for states 140-142. These are similar to those described above.

In this way, for any starting state and any set of transmission parameter values, the probabilities of one transmission moving the model to respective subsequent states are determinate. The problem to be solved is to select transmission parameter values for the initial transmission that maximize the overall likelihood of successful transmission before the latency window expires.

To drive convergence to the desired outcome, a reward function R can be defined on the state space. In examples, R can be set proportional to +10 for Success, −100 for Failure, and −1 for any other state. The slight negative penalty for the other states can be introduced to incentivize the MDP solver to prefer solutions with fewer transmissions. Other relative weights of rewards can be used. For example, the penalty for the other states can be dependent on how much latency budget remains.

Example Solution of Problem

Several dynamic programming ("DP") algorithms are applicable to solving MDP problems, such as value iteration, policy iteration, or generalized policy iteration. Other applicable techniques include machine learning (in particular, reinforcement learning) and decomposition methods (e.g. branch-and-bound, branch-and-cut). The model described herein was solved using a value iteration DP algorithm, which executes a nested loop as shown in Table 2.

TABLE 2

| State value iteration procedure to determine optimal state value |
| --- |
| 201 Initialize V(S) arbitrarily |
| 202 Initialize $\theta \leftarrow 10^{-8}$ to test convergence |
| 203 repeat |
| 204 $\Delta \leftarrow 0$ |
| 205 for each $S \in \{S\}$ do |
| 206     $v \leftarrow V(S)$ |
| 207     $V(S) \leftarrow \max_A \Sigma_{S'} p(S' \mid S, A) \cdot [R(S') + V(S')]$ |
| 208     $\Delta \leftarrow \max (\Delta, \lvert v - V(S) \rvert)$ |
| 209   end for |
| 210 until $\Delta < \theta$ |

Each state S is assigned a value V(S), line 201. An outermost loop (repeat . . . until, lines 203-210) iterates until the values V(S) converge to within a predefined threshold θ across the state space (lines 202, 210). At each iteration of the outer loop, a next loop (for . . . end for, lines 205-209) iterates over all states S, keeping track of the maximum change in value ΔV of any state S relative to the previous outer loop iteration (lines 206, 208). For each state S, the value V(S) is updated according to the values V(S') of states that can be reached from S after one (more) transmission (line 207). The various permissible transmission acts are denoted {A}, each A reflecting a different choice of transmission parameter values. The summation Σ at line 207 indicates an expectation value of the score V(S) on a next step, after performing transmission A. Inclusion of the reward term R(S) shows that a transmission act that leads with high probability to Success can have a higher expectation value than a transmission that leads to Failure with a high probability: the selection "$\max_A$" at line 207 ensures that the algorithm selects the optimum transmission. This value of A can be saved as A(S), either after the procedure has converged, or continually at each iteration. To determine the best A, a third level of iterations can be performed at line 207, to evaluate the summation Σ for each of a candidate set of transmission parameter values {A}, so as to choose the best one.

As the algorithm of Table 2 converges, the value of A(S) specifies the optimum transmission parameter values for a first transmission from initial state S, which is known from latency budget and channel SNR. The operation of this algorithm demonstrates that the transmission parameters are jointly determined.

In operation, it can be sufficient to determine the transmission parameter values. However, to demonstrate the performance of disclosed technologies, the overall probability of failure or success can be determined by simulation, experiment, or computation. The results presented at FIGS. 10-11 herein were obtained by running simulations using results obtained by the procedure of Table 2, and other simulations using comparative techniques.

Additional mathematical details of the model and solution have been provided in inventors' publication Saatchi et al. "Novel Adaptive Transmission Scheme for Effective URLLC Support in 5G NR: A Model-Based Reinforcement Learning Solution" IEEE Wireless Communications Letters, vol. 12, no. 1, pp. 109-113, IEEE, available online November 2022, which is incorporated by reference herein in entirety.

First Example Method

FIG. 2 is a flowchart 200 of a first example method for wireless data transmission. In this method, values of multiple transmission parameters are jointly determined, and a data packet is transmitted according to these transmission parameter values. This method can be performed by a processor in a transmitter.

At process block 210, values of multiple transmission parameters can be jointly determined. The transmission parameters can include slot size, subcarrier spacing, modulation scheme, coding rate, and/or other transmissions parameters described herein. The transmission parameters can be dependent on variables such as data packet size, channel state information (e.g. SNR or SINR), or latency requirement. The joint determination can be performed for multiple combinations of such variables.

At process block 230, a data packet can be acquired. To illustrate, data provided by a sensor or other source component can be provided to the transmitter over a bus and can be stored in a computer-readable storage medium accessible by a processor within the transmitter. A push technique controlled by the source can be used, or a polling technique controlled by the processor can be used.

At process block 250, jointly transmission parameter values can be obtained corresponding to instant values of data packet size, channel state information, and latency requirement. These jointly determined transmission parameter values can be selected from those determined at block 210.

In some examples, block 250 can follow block 230, and can use properties of the instant data packet (e.g. a packet size, or a transmission constraint) as inputs to block 250, but this is not a requirement. In other examples, block 250 can run independently of block 230, e.g. if data size and transmission constraints are known in advance of acquiring the data packet. To illustrate, block 250 can run each time new channel state information is received from an intended receiver, or can run according to a schedule, or can run responsive to a trigger signal received from the source component. In any of these ways, a delay in performing block 250 can be avoided, between acquisition of the data packet and its transmission.

At process block 270, the data packet can be transmitted using the jointly determined transmission parameter values obtained at block 250, under control of a processor. To illustrate, the data packet can be divided into respective segments for each of multiple subcarriers, wherein the number of available subcarriers can be determined based on the subcarrier spacing. Each segment can be encoded (e.g. with forward error correction) and transformed into symbols and corresponding constellation points, which in turn can be scaled according to the transmit power, and applied as modulation to a carrier signal. As an illustration, a slot size of 3 for 15 subcarriers provides 45 total symbols, or 6×45=270 bits in a 64-QAM constellation. Derating for 32 bit protocol overhead and 6/7 coding rate, the jointly determined transmission parameter values can support $(6/7)×(270-32)=204$ bits of payload from the acquired data packet. This is sufficient for a 32 byte (192 bit) payload. However, if the data packet does not fit within one slot, the data packet transmission can be partitioned across multiple slots.

Numerous extensions and variations of this method can be implemented, some of which are described above, and others of which are described in context of FIG. 3 or elsewhere herein. In some examples, the joint determination at block 250 can maximize predicted reliability subject to a maximum latency constraint. The transmission parameter values can be determined to comply with a standard, which can support flexible subcarrier spacing, flexible slot size, flexible modulation scheme, or flexible coding rate. To illustrate, in a 5G New Radio standard, slot sizes of 4 and 7 are permitted, while 5 and 6 are not. In such a situation, the joint determination of parameter values can restrict slot size to a permissible value, and similarly for other transmission parameters. The joint determination can be performed using dynamic programming to solve a Markov decision process (MDP) problem.

In further examples, the method can be repeated for a succession of data packets. The data packets can be a stream. To illustrate, a stream of data packets can indicate progressing cutting depth in a machine tool, changing brightness or distance as extracted from a sequence of camera images, or status reports from an IoT device. Still further, a single transmitter can support multiple data streams, distinguished by variables such as source component, destination component, data packet type, or associated transmission constraints. To illustrate, a computer numerically controlled (CNC) machine tool can report many variables to a control station—three sensor readings for X, Y, Z translation coordinates, two sensor readings for angular orientation of the tool head or workpiece, and further sensors reporting tool speed, temperature, coolant flow, or alarm conditions—each of which can have its own respective stream.

Based on storage of transmission parameter values determined at block 250 in a table, database, or other data structure, the obtaining at block 250 can be performed using table look-up, database search, interpolation, extrapolation, or another technique for data retrieval.

Data packets can also be concatenated. Two dissimilar packets delivered at about the same time to a transmitter can be processed as a single larger packet, with one set of transmission parameter values determined for the concatenated packet.

Second Example Method

FIG. 3 is a flowchart 300 of a second example method which can be used for wireless communication of one or more data packets. Building on the basic method of FIG. 2, this method illustrates certain aspects of the joint determination of transmission parameters which can be implemented in some embodiments, as well as a retransmission facility.

At process block 330, a data packet can be acquired for transmission to one or more intended receivers. Similar features and considerations apply to block 330 as for block 230 discussed above. However, in this method blocks 335 or 340 can be performed prior to determination of the transmission parameter values.

At optional block 340, shown in dashed outline, parameters of the data packet can be determined—including, for example, data packet size, one or more intended recipients, a latency requirement, or other transmission constraints. Because these various data packet parameter values can be known in advance, some embodiments can omit this block. In further embodiments, some data packet parameter values can be known in advance while values of other parameters can vary from one data packet to the next.

At block 335, channel state information can be obtained. The channel state can influence transmission parameter determination in various ways. To illustrate, if SNR (or, SINR) is high, it can be feasible to use a high order modulation scheme, a less powerful (and less computationally intensive) form of coding, or lower transmit power. Conversely, if SNR (or, SINR) is low, it can be desirable to use low-order modulation (e.g. BPSK, QPSK), more robust FEC coding, and/or higher transmit power. As another illustration, if dispersion in the channel is high, it can be desirable to use smaller subcarrier spacing while, with low channel dispersion, high subcarrier spacing and higher bandwidth symbols can be feasible.

In some examples, block 335 is performed responsive to acquisition of the data packet at block 330. In other examples, block 335 can run independently of data packet acquisition. In varying embodiments, block 335 can be free-running, can be performed responsive to receipt of channel state information from an intended receiver, or can be performed according to a predetermined schedule. Accordingly, arrow 333 is shown dashed to indicate that block 335 can be dependent on block 330 in some examples but not in others.

Proceeding to block 350, jointly determined transmission parameter values can be obtained, corresponding to parameters associated with the data packet and channel state and, optionally, other parameters. Other aspects of block 350 can be similar to those discussed in context of block 250 discussed above. In some examples, the transmission parameter values can be precalculated, similar to block 210.

At block 360, the transmission parameter values can be communicated to the one or more intended receivers, thereby facilitating reconstruction of the data packet at a receiver, from the signal transmitted and received over-the-air. The transmission parameter values can be communicated over a control channel distinct from a data channel over which the data packet is transmitted.

At process block 370, the data packet can be transmitted in conformance with the jointly determined transmission parameter values obtained at block 350, under control of a processor. While the transmission can have a high probability of successful reception, this is not guaranteed. Accordingly, the method can proceed to decision block 372, where a determination can be made whether the transmission was successful. To illustrate, an intended receiver can compute a checksum, or verify that the received data is a valid FEC codeword, to determine that the data packet was successfully received. The receiver can send an acknowledgment to the transmitter conveying whether the transmission was successful, or not.

If the transmission was successful, the method can follow the Y branch from block 372 to successful termination at block 390. However, if the transmission is found to have failed, then the method can follow the N branch from block 372 to either block 370 or block 335. In some examples, the timescales for transmission and acknowledgment are short compared to the rate of change of the channel, and the N branch can be followed to block 370 for retransmission of the data packet with transmission parameter values obtained previously at block 350. In other examples, such as in a vehicle moving at high speed, the channel state (e.g. SNR) can change rapidly and it can be desirable to follow the N branch from block 372 to block 335 so that fresh channel state information can be used to recompute updated transmission parameter values at block 350, which can be used for retransmission at block 370.

The entire retry facility is shown in dashed outline 380 as optional. Retry facility 380 can be completely omitted in some examples, or can be selectively used in other examples. To illustrate for a given data stream between a transmitter and receiver, the transmitter can determine under some conditions that better reliability can be obtained by transmitting the packet quickly, in less than about 50% of the available latency window, with the intention of retransmitting to increase the likelihood of successful reception. However, in other channel conditions, the transmitter can determine that using a single slower transmission offers higher reliability.

Numerous extensions and variations of this method can be implemented, some of which are described above, and others of which are described in context of FIG. 2 or elsewhere herein. For example, the notification of transmission parameter values can be sent in-band as a preamble to the wireless transmission. In further examples, some transmission parameter values can be conveyed in a control channel while others are communicated in the preamble. The joint determination of parameter values can be based on a size of the data packet, channel state information of the channel over which the data packet is to be transmitted, and a latency budget. The precalculated transmission parameter values can be updated over multiple iterations of FIG. 3, e.g. by reinforcement learning or another machine learning technique.

Disclosed technologies can also be applied in MIMO (multiple-input multiple-output) systems, supporting multiple streams (channels) between a transmitter and receiver over respective combinations of transmit and receive antennas. Each MIMO stream can have a respective SNR or channel state, which may be different. The disclosed technologies can be applied to select optimum values of transmission parameters for each stream in a MIMO system.

Example Time Structure

Figure 4:
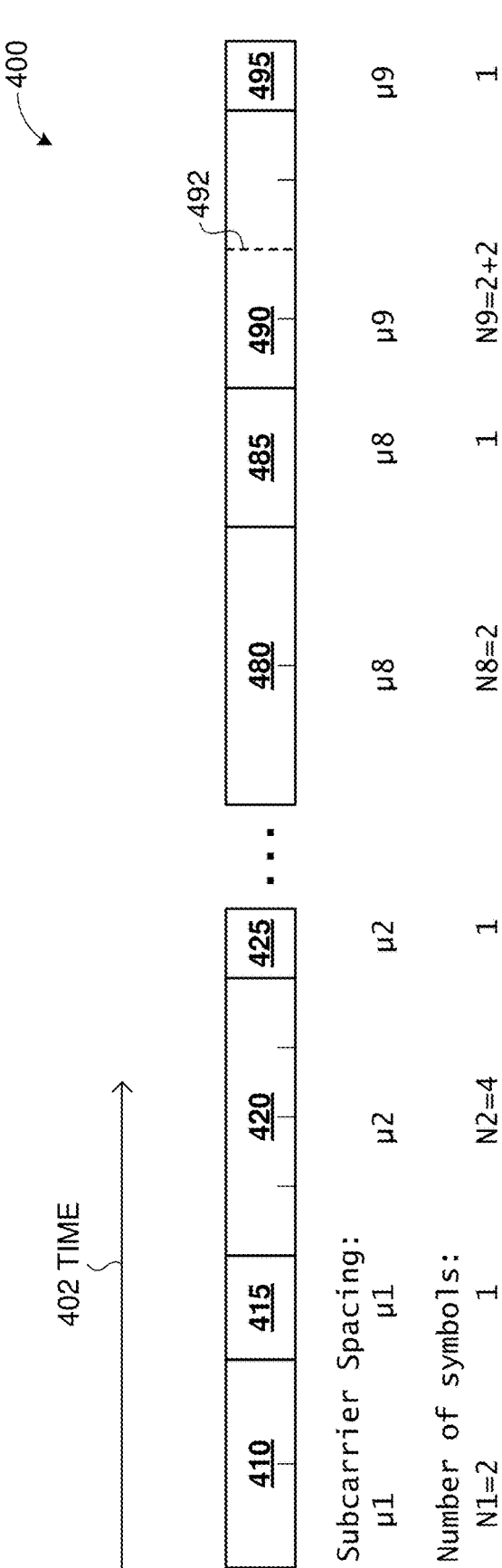
FIG. 4 is a diagram depicting an example time structure of transmissions over a channel operated with flexible transmission parameters, according to some examples of the disclosed technologies.

FIG. 4 is a diagram 400 depicting an example time structure of transmissions over a channel, using flexible transmission parameters. Shown in FIG. 4 is an alternating sequence of forward data transmissions 410, 420, . . . , 480, 490 and reverse acknowledgments 415, 425, . . . , 485, 495 over the channel. Arrow 402 indicates time increasing from left (earliest) to right (latest).

In FIG. 4, the subcarrier spacing μ and number of symbols N are listed beneath each transmission. As described herein, the transmission time for one symbol t1 can be dependent on subcarrier spacing μ, as tighter spacing implies narrower subcarrier bandwidth, and hence more time for a given symbol to be transmitted on a subcarrier. The total time tN for a data packet to be transmitted also depends on the number of symbols N required on each subcarrier, $tN=t1\times N$. In examples, the acknowledgment to the $i^{th}$ data packet can be sent with the same subcarrier spacing as the transmission of the $i^{th}$ data packet. Generally, an acknowledgment can be transmitted in one symbol time t1.

Starting at the left side of FIG. 4, a first data packet 410 is transmitted with subcarrier spacing μ1 and a length of $N1=2$ symbols, and is followed by its acknowledgment 415. Tick marks within data packet 410 demarcate individual symbols, and the duration of acknowledgment 415 equals the transmission time t1 of each symbol within data packet 410.

A second data packet 420 is transmitted with wider subcarrier spacing μ2 and, accordingly, shorter symbol time. However, data packet 420 requires $N2=4$ symbols. Once again, the duration of acknowledgment 425 equals the transmission time t1 of each symbol within data packet 420.

In some examples, data transmissions 410, 420 can be successive transmissions of different data packets. In other examples, 420 can be a retransmission of data packet 410, with acknowledgment 415 indicating failure of transmission 410.

The transmissions continue over the channel. Another data packet 480 is transmitted with subcarrier spacing μ8 narrower than for data packet 410. Thus, although the number of symbols $N8=2$ is the same as for data packet 410, each of data transmission 480 and its acknowledgment 485 requires more time than the corresponding transmissions 410, 415.

Data transmission 490 illustrates a variation in retransmission, with a same 2-symbol transmission repeated back-to-back without waiting for an acknowledgement. Such a scheme can avoid the overhead of waiting for an acknowledgment and recomputing transmission parameter values, yet can offer higher reliability than transmitting the 2-symbol data packet just once. Thus transmission 490 is shown partitioned by dashed line 492, with two symbols transmitted before boundary 492 and two symbols after. The total transmission length is $N9=2+2$, and the data transmission is followed by acknowledgment 495 having length of one symbol.

For simplicity of illustration, transmissions are shown without gaps. In practice, the time structure can also include preambles, inter-frame gaps, inter-symbol gaps, or other protocol overhead. Moreover, some applications of the disclosed technologies can have sparse data traffic, with large time intervals between successive data transmissions.

In varying examples, acknowledgments can be transmitted on a same channel as the data transmissions, or on a different channel. In the latter case, a second data transmission can be commenced right after a first data transmission has completed, without waiting for acknowledgment of the first transmission. This can advantageously improve throughput or reduce latency where a single transmitter is supporting multiple data streams, e.g. unsynchronized data streams.

Example Sequence Diagram

Figure 5:
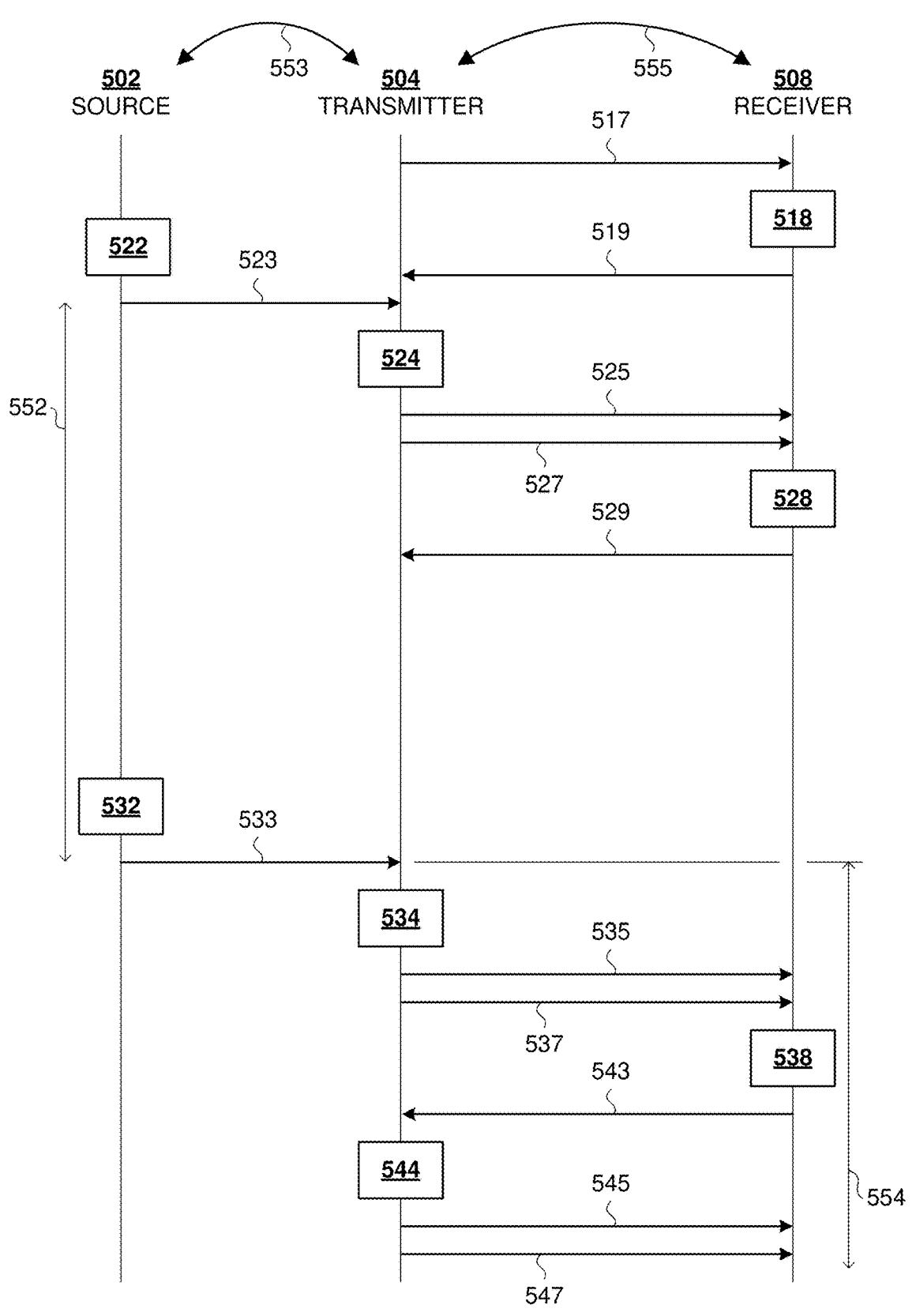
FIG. 5 is a sequence diagram illustrating examples of the disclosed technologies.

FIG. 5 is a sequence diagram 500 illustrating examples of the disclosed technologies. In this diagram, a radio transmitter 504 obtains data packets from a source component 502 (e.g. a local sensor), determines wireless transmission parameters, and transmits the data packets to a radio receiver 506. Time proceeds downward in FIG. 5, which is not to scale.

At the top of FIG. 5, arrow 555 denotes a wireless link between transmitter 504 and receiver 506. This arrow is bidirectional, indicating that receiving device 506 can communicate over a reverse channel to transmitting device 504. The wireless link can be over a cellular band, e.g. 5G, or over other licensed or unlicensed bands. Standardized or proprietary protocols can be employed.

Similarly, arrow 553 denotes a communication link between source component 502 and transmitter 504. Commonly, communication link 553 is a wired connection, e.g. on a circuit board or over a cable, but this is not a requirement, and local wireless, acoustic, fiber optic, or other communication links can also be used. A wired connection can be a shared memory location or a shared bus of a device containing source component 502 and radio transmitter 504. While arrow 553 is shown to be bidirectional, indicating data packets delivered to transmitter 504 and control provided a processor included in transmitter 504, this is not a requirement. In some examples, there may be no communication from transmitter 504 to source 502.

Initially, source 502 can form a data packet at process block 522, and can provide this data packet to transmitter 504 as shown by arrow 523.

Separately, transmitter 504 can receive a channel estimate from receiver 508, as shown by arrow 519. The channel estimate can be determined by receiver 508 at process block 518, based on a prior communication, shown by arrow 517, from transmitter 504 to receiver 508 over the same channel.

With channel estimate and data packet in hand, transmitter 504 can proceed to jointly determine two or more transmission parameters at block 524. Thereafter, transmitter 504 can transmit the transmission parameter values to receiver 508, e.g. over a control channel, as shown by arrow 525. Transmitter 504 can also transmit the data packet to receiver 508, as shown by arrow 527, using these same transmission parameter values, e.g. for controlling subcarrier spacing, slot size, or adaptive modulation and coding.

Arrow 525 is depicted at an earlier time than arrow 527. For example, the notification 525 of transmission parameter values can be performed while transmitter 504 is preparing the data packet for transmission, according to those transmission parameter values. This also provides an opportunity for receiver 508 to configure its receiver chain according to the transmission parameter values before the data packet arrives at receiver 508. However, this ordering is not a requirement and, in other examples, arrows 525, 527 can occur with at least partial temporal overlap, or arrow 527 can be performed before arrow 525. To illustrate, receiver 508 can buffer received signals for subsequent decoding, or can operate multiple signal receiver chains for respective (different) subcarrier spacings. In some examples, the transmission parameter values can be transmitted in-band, e.g. within a preamble of the data packet.

At block 528, receiver 508 can extract the data packet from received signals and, in doing so, can determine whether the packet was correctly received. Receiver 508 can also formulate an acknowledgement message, and transmit the acknowledgement message back to transmitter 504, on a reverse channel of wireless link 555, as shown by arrow 529. Reverse transmission 529 can also include channel state information, which can also be detected at block 528 from one or both of signal receptions 525, 527.

In a first case, the transmission parameter values determined at block 504 do not support retransmission within a latency window, and the data packet can be retired at any time after transmission 527. In some examples, the success or failure can be logged at transmitter 504 based on the status indication included with acknowledgment 529, or can be used to monitor measured reliability or error rates and compare with an estimated reliability determined at block 524. Such feedback can be used to refine the parameter determination procedure implemented at block 524. Particularly, as described herein, the data packet can be regarded as stale once its latency window expires, and can be discarded even if transmission 527 was reported as a failure at block 529. Accordingly, the data packet can be retired regardless of whether transmission 527 succeeded or failed.

In a second case, the transmission para parameter values meters determined at block 504 do support retransmission, yet acknowledgment 529 reports that transmission was successful. In such a case, the data packet can be retired at transmitter 504 upon receipt of acknowledgment 529. Because transmission 527 was successful, no retransmission is performed.

A third case illustrating retransmission begins at block 532, where source 502 forms another "new" data packet. This data packet is acquired by transmitter 504 as indicated by arrow 533. At block 534, transmitter 504 can determine transmission parameter values for the new data packet, based on channel state information obtained with acknowledgment 529, or from another reverse channel message (not shown) and, optionally also based on attributes of the new data packet. As before, the transmission parameter values for the new data packet, and the new data packet itself, are transmitted to receiver 508 as shown respectively by arrows 535, 537. At block 538, receiver 508 detects the received new data packet and makes a determination whether the new data packet was correctly received and detected. Accordingly, receiver 508 returns an acknowledgment 543 to transmitter 504. In the illustrated sequence, acknowledgment 543 indicates that transmission 537 failed. At block 544, transmitter 504 can recalculate transmission parameter values for the new data packet, e.g. based on updated channel conditions received from receiver 508. Then, retransmission parameter values can be transmitted as shown by arrows 545, and retransmission of the new data packet can be performed as shown by arrow 547. Arrow 554 indicates the latency window of the new data packet, starting with its arrival at transmitter 504. Notably, retransmission 547 is performed before expiration of latency window 554.

FIG. 5 also shows time interval 552 between successive data packets arriving at transmitter 504. In some examples, time interval 552 can be much larger than the latency window associated with any single packet. That is, each data packet 522, 532 requires quick delivery to receiver 508, but these data packets can form a sparse stream, with time interval 552 being 5-20, 20-100, 100-500, or 500-2000 times the duration of latency window 554. In further examples, multiple streams from one or more sources 502 can be provided interspersed to transmitter 504. Two streams can differ by data type, repetition rate, latency budget, intended destination, or other parameters.

Example Network

Figure 6:
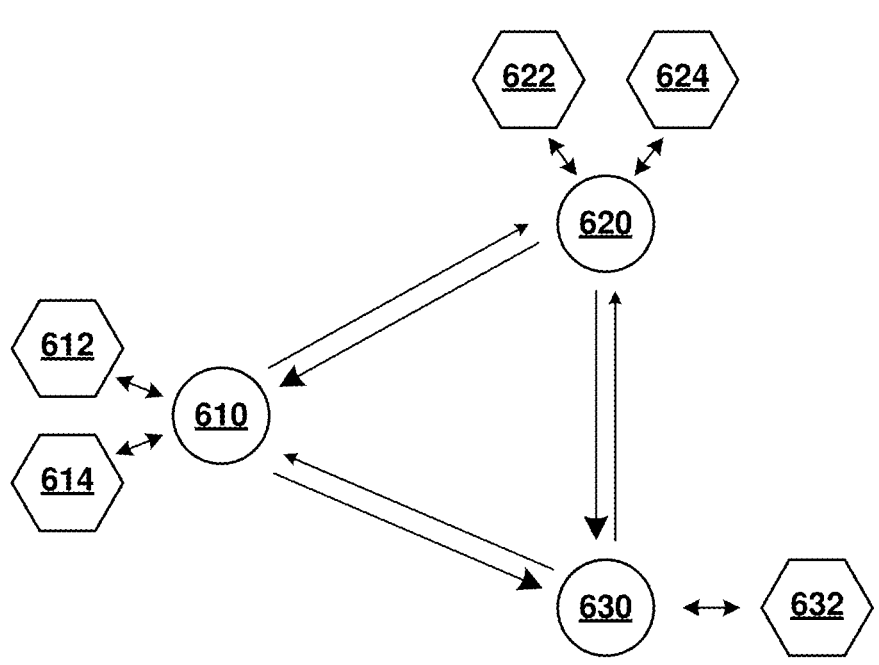
FIG. 6 is a diagram of an example network implementing the disclosed technologies.

FIG. 6 is a diagram 600 of an example network, illustrating different configurations of receivers and transmitters in examples of the disclosed technologies.

Three radio terminals 610, 620, 630 are shown as circles, each having transmit and receive capabilities. Pairs of arrows connect radio terminals 610, 620, 630 as shown. One arrow of each pair has a large arrowhead, denoting a direction of communication of data packets and transmission parameter values, while the other arrow of each pair has a small arrowhead, denoting reverse traffic for communication of channel state information or acknowledgments, e.g. over a reverse control channel. Thus, both terminals 610, 620 are configured to communicate data packets to terminal 630, and terminal 620 can also send data packets to terminal 610. In this configuration, terminal 610 can act as both transmitter and receiver of data packets, while terminal 620 is only a transmitter, and terminal 630 is only a receiver.

Hexagons depict source or destination components coupled to respective radio terminals. These components can use communication facilities of their associated radio terminals for transmission or reception of data packets. Components 612, 614 are coupled to radio terminal 610. Illustratively, source component 612 can generate sensor information which can be conveyed in data packets via radio terminals 610, 630 to central controller component 632. Source component 622 can generate sensor information which can be conveyed in data packets via radio terminals 620, 610 to local controller component 614. Concurrently, source component 624 can generate status information which can be conveyed in data packets via radio terminals 620, 630 to central controller 632.

Numerous extensions and variations of this network can be implemented. In some examples, a given pair of radio terminals can have data packets transmitted in both directions, for example two self-driving cars nearing each other can exchange sensor or status information which can be utilized by each vehicle to safely approach or pass by the other vehicle. In further examples, terminal 610 can act as a relay, receiving data packets from terminal 620 and forwarding the same packets, with newly calculated transmission parameter values, to terminal 630.

Example Applications

A. IoT (Internet-of-Things)

Figure 7:
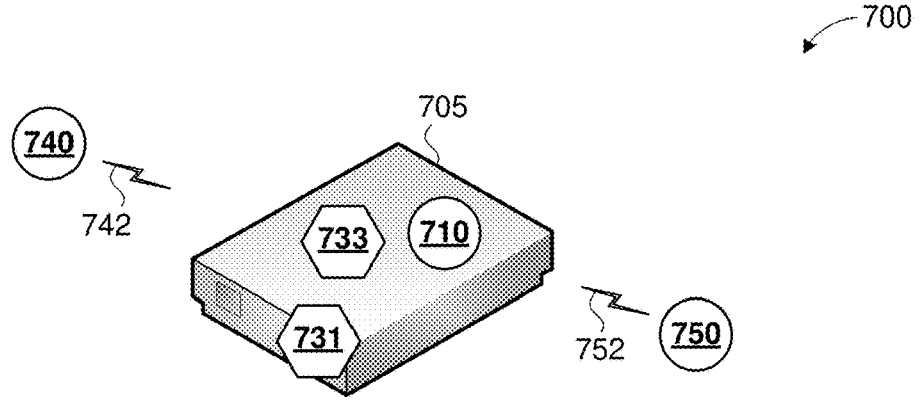
FIG. 7 is a diagram illustrating an Internet-of-Things (IoT) application of the disclosed technologies.

FIG. 7 is a diagram 700 illustrating an Internet-of-Things (IoT) application in which the disclosed technologies can provide reliable low-latency service. Non-limiting examples of IoT environments which can benefit from the disclosed technologies include an electrical power grid, remote-control surgery, or the transportation or industrial automation environments described in more detail herein.

IoT device 705 is illustrated with a radio terminal 710 and two client components 731, 763. IoT device 705 can have varying roles within its IoT: as a producer (e.g. a sensor) that generates data for transmission to other IoT devices; as a consumer (e.g. an actuator) that receives data transmitted from other IoT devices; or as a controller which receives data from some device(s) and computes data to be transmitted to the same or different device(s). Accordingly, client components 731, 733 can variously be sensors, actuators, microprocessors, or other components.

Also shown in FIG. 7 are exemplary radio terminals 740, 750 of other IoT devices (not shown) coupled to radio terminal 710 via wireless links 742, 752. These coupled IoT devices can also include producers, consumers, or controllers, in any combination. In examples, the IoT encompassing terminals 710, 740, 750 can include additional IoT devices—tens, hundreds, thousands, millions, or even billions of devices. At the other limit, terminal 750 can be omitted, and the IoT can include only the two devices associated with terminals 710, 740.

The IoT can be a fully connected network, in which every device (or, terminal) can communicate directly with every other device (or, terminal) in the IoT, but this is not a requirement. Often, an IoT device will only have direct links to a subset of devices in the IoT. For example, directly coupled devices can be selected according to proximity or functional considerations.

The utility of the disclosed technologies can be illustrated with examples. In an electrical power grid, a sensor 731 can detect a fault condition (e.g. overcurrent, transient voltage, or overtemperature), form a data packet, provide the data packet to radio transmitter 710, which can utilize the disclosed technologies to communicate the data packet quickly and reliably to a local terminal 740 (e.g. at a circuit breaker) or a distant terminal 750 (e.g. at a grid control center), thereby enabling prompt remediation. Alternatively, device 705 can be the local circuit breaker in this scenario, receiving the data packet and triggering actuator 733 to open a circuit. Still further, device 705 can be the grid control center in the same scenario. The received data packet can be relayed to a microprocessor 733, which can execute a control program and issue a trip command to the circuit breaker device and, optionally, additional commands to other grid devices.

In a remote-control surgery environment, surgical robot 705 proximate to a patient can have a sensor 731 (e.g. a camera or a position indicator) and an actuator 733 (e.g. a motion controller for a robotic arm or a cutting tool, or a fluid controller for a fluid delivery or fluid evacuation subsystem). The sensor can provide a data packet to radio terminal 710, which can utilize the disclosed technologies to communicate the data packet quickly and reliably to a workstation proximate to a remote surgeon. Armed with up-to-date information of the patient's environment, the surgeon can operate workstation controls to transmit data packets (e.g. commands) back to surgical robot 705 to continue operation on the patient. Alternatively, device 705 can be the surgeon's workstation in this scenario, receiving sensor data packets transmitted by the surgical robot, and transmitting data packets for actuator commands back to the surgical robot. The received data packets can be presented to the surgeon on output component 731. and actuator commands can be sourced from input component 733. Illustratively, output component 731 can include a display or haptic feedback apparatus, while input component can include a mouse, keyboard, haptic controller, or microphone.

B. Motor Vehicle

Figure 8:
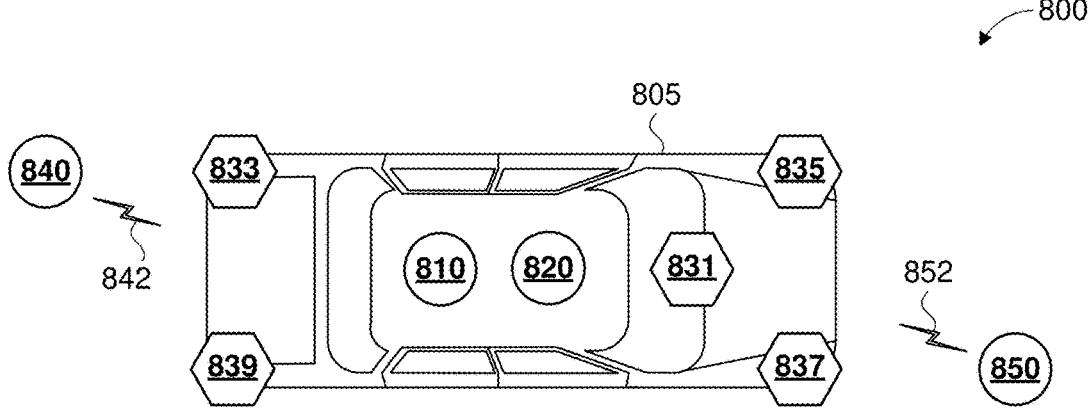
FIG. 8 is a diagram illustrating a motor vehicle application of the disclosed technologies.

FIG. 8 is a diagram 800 illustrating a motor vehicle application in which disclosed technologies can provide reliable low-latency service. Non-limiting examples of motor vehicle environments which can benefit from the disclosed technologies include: autonomous or self-driving vehicles (e.g. communication among vehicles or between a vehicle and a stationary radio terminal); integration of a controller with sensors or actuators within a single vehicle (e.g. with or without a driver); remotely operated drones or other vehicles; or platooning vehicles (e.g. one vehicle, with or without an operator, directing a group of proximate vehicles having wireless but not physical coupling between vehicles).

Vehicle 805 is illustrated with two radio terminals 810, 820 and a group of client components 831, 833, 835, 837, 839. In varying examples, client components 831-839 can include one or more controllers, sensors, actuators, or other components, in any combination.

Also shown in FIG. 8 are exemplary radio terminals 840, 850 of other devices (not shown) coupled to radio terminal

810 or 820 via wireless links 842, 852. The devices associated with terminals 840, 850 can be other vehicles, or part of transportation infrastructure, in any combination. For example, a data packet from sensor 833 or dashboard controller 831 can be transmitted from terminal 810 to terminal 840 on another vehicle. This data packet can aid the partner vehicle in making its navigation decisions. Alternatively or additionally, the data packet can be transmitted from terminal 820 to infrastructure terminal 850, providing the transport infrastructure with situational awareness of traffic conditions (e.g. traffic density, flow conditions, congestion, stalls, accidents, or driving patterns). As another example, a data packet can be received from another vehicle, or from transport infrastructure, over wireless link 842 and used locally at vehicle 805 for making navigation decisions at controller 831 or applying brakes by actuator 835.

The utility of the disclosed technologies can be illustrated with examples. Data from another vehicle can provide speed, acceleration, or braking information which can be more accurate than data obtained locally at vehicle 805, allowing vehicle 805 to reduce its risk of a collision or find a navigation solution which reduces the transit time or energy consumption of vehicle 805 while negotiating a given traffic situation. Conversely, data provided to the other vehicle can assist the other vehicle better achieve its objectives of safety, transit time, or energy expenditure. Data exchange can enable vehicles to negotiate priority among themselves, which can be of value in many situations, including but not limited to situations involving emergency vehicles. Data obtained from infrastructure can inform vehicle 805 of obstructions or clear traffic conditions around a bend where there is no direct line of sight. Data provided to infrastructure can allow the infrastructure to identify problem situations (e.g. impaired driver, traffic jam) or dispatch service or emergency vehicles to assist. In some examples, transmitter 850 can be mounted on an airborne sentry (e.g. helicopter, airplane, or drone) for monitoring or control of a terrestrial transport environment.

C. Industrial Automation

Figure 9:
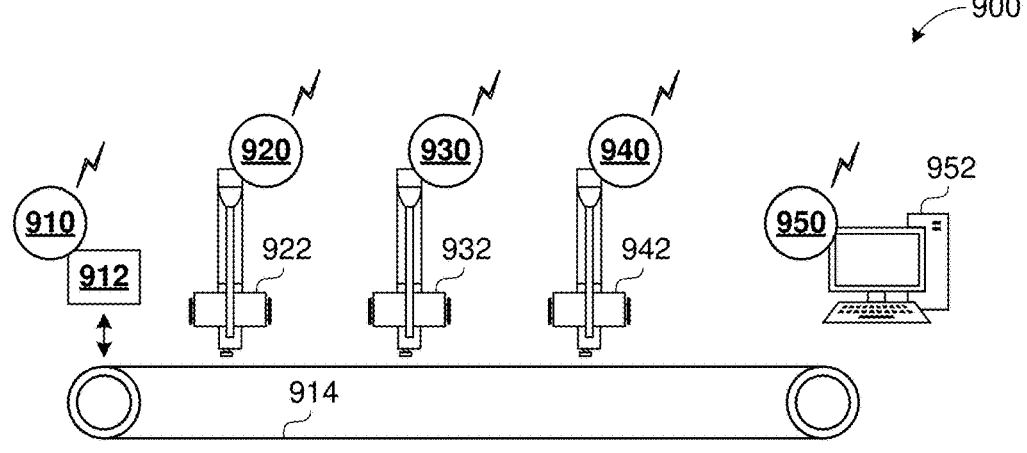
FIG. 9 is a diagram illustrating an industrial automation application of the disclosed technologies.

FIG. 9 is a diagram 900 illustrating an industrial automation environment in which the disclosed technologies can provide reliable low-latency service. Non-limiting examples of industrial automation environments which can benefit from the disclosed technologies include discrete manufacturing (e.g. based on assembly lines or conveyor belts), continuous or batch manufacturing (e.g. chemical plants or semiconductor processing facilities), utilities (e.g. an electricity-generating power plant). A discrete manufacturing environment is shown in FIG. 9. Other industrial automation environments can operate similarly and can offer similar advantages.

Shown in FIG. 9 are transporter 914, its controller 912, machinery 922, 932, 942 (e.g. milling machines, welders, grinders, spray painters, or suchlike), and a central controller 952. Central controller 952, transport controller 912, and machinery 922, 932, 942 each have a respective radio terminal 950, 910, 920, 930, 940 as illustrated, which can communicate wirelessly among themselves. Through reliable low-latency communication, actions of transporter 914 and machinery 922, 932, 942 can be precisely coordinated. For example, transmitter 920 can signal to central controller 952 or transport controller 912 that a workpiece has reached a desired position, and the transporter can be stopped promptly. Quick communication can also enable feedback control between devices, e.g. in a servo loop, or other forms of motion control.

Example Improvements

Figure 10:
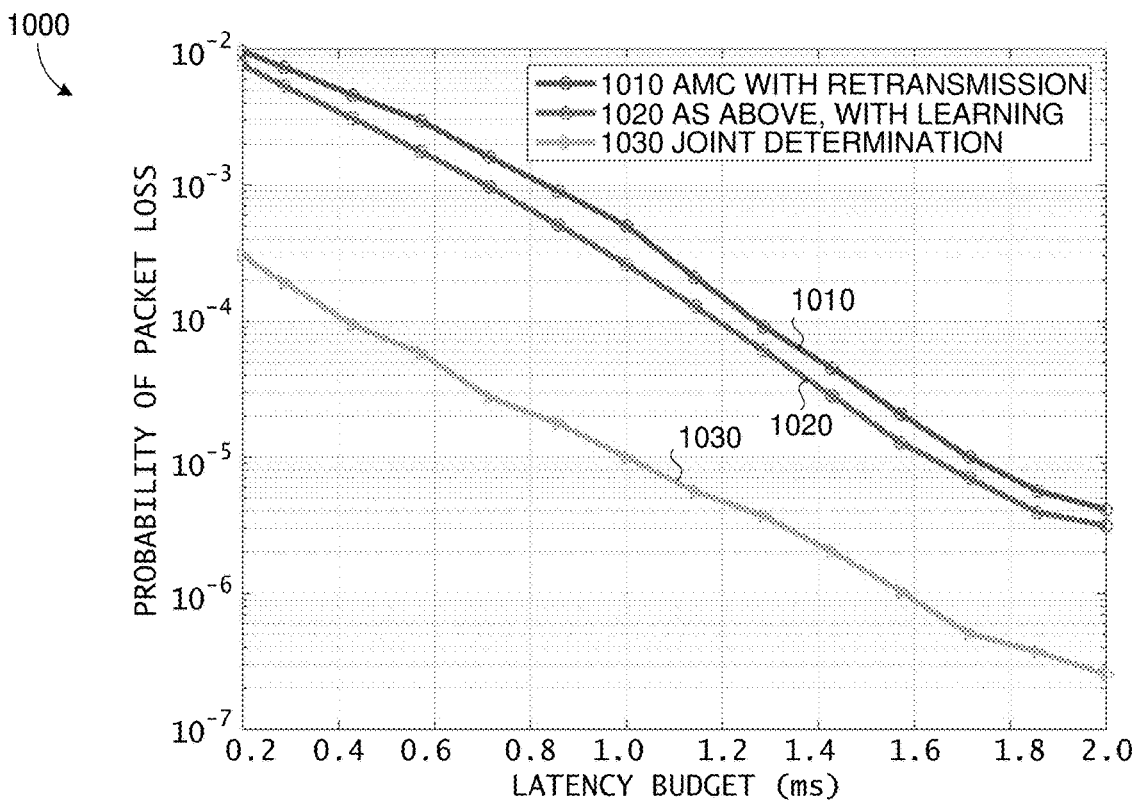
FIG. 10 is a first chart illustrating improved performance achieved with the disclosed technologies.

FIG. 10 is a first chart 1000 illustrating improved packet loss performance achieved with the disclosed technologies. Three graphs 1010, 1020, 1030 are shown for modeled performance according to respective schemes of transmission planning. All three schemes were modeled with SNR=6 dB. For applications such as those discussed in context of FIGS. 7-9, typical environments commonly have at least 6 dB SNR.

Graph 1010 applies adaptive modulation and coding (AMC), described e.g. in Andrea J. Goldsmith et al., "Variable-Rate Variable-Power MQAM for Fading Channels," IEEE Transactions on Communications 45 (10), IEEE 1997, pp. 1218-1230, while graph 1020 applies a learning-based AMC scheme as described e.g. in S. Mashhadi et al., "Deep reinforcement learning based adaptive modulation with outdated CSI," IEEE Communications Letters 25 (10), IEEE 2021, pp. 3291-3295. However, the schemes modeled to derive graphs 1010, 1020 were modified to incorporate retransmission within a latency window, as described herein, to remove this aspect of variation between the evaluated schemes. That is, the schemes used for graphs 1010, 1020 diverge from the descriptions in the respective publications noted above. Comparison of graphs 1010, 1020 shows that reinforcement learning provides at best about a factor of two reduction in packet loss rate over a wide range of latency budgets.

Graph 1030 shows performance for a scheme utilizing joint estimation of transmission parameter values as disclosed herein, and also incorporates retransmission capability. Graph 1030 demonstrates dramatic improvement achievable through joint selection of transmission parameter values: more than ten times reduction in packet loss rate over the entire latency range shown as compared to graph 1020 (AMC with learning and retransmission), and over twenty times lower packet loss rates compared to graph 1010 (AMC with retransmission).

The data of FIG. 10 can also be viewed as a latency improvement for any given packet loss rate. For example, the disclosed technologies can achieve five nines reliability with a latency window of about 1 ms, compared to about 1.7 ms for comparative schemes of graphs 1010, 1020. This 40% reduction in latency also demonstrates the utility of the disclosed technologies.

Figure 11:
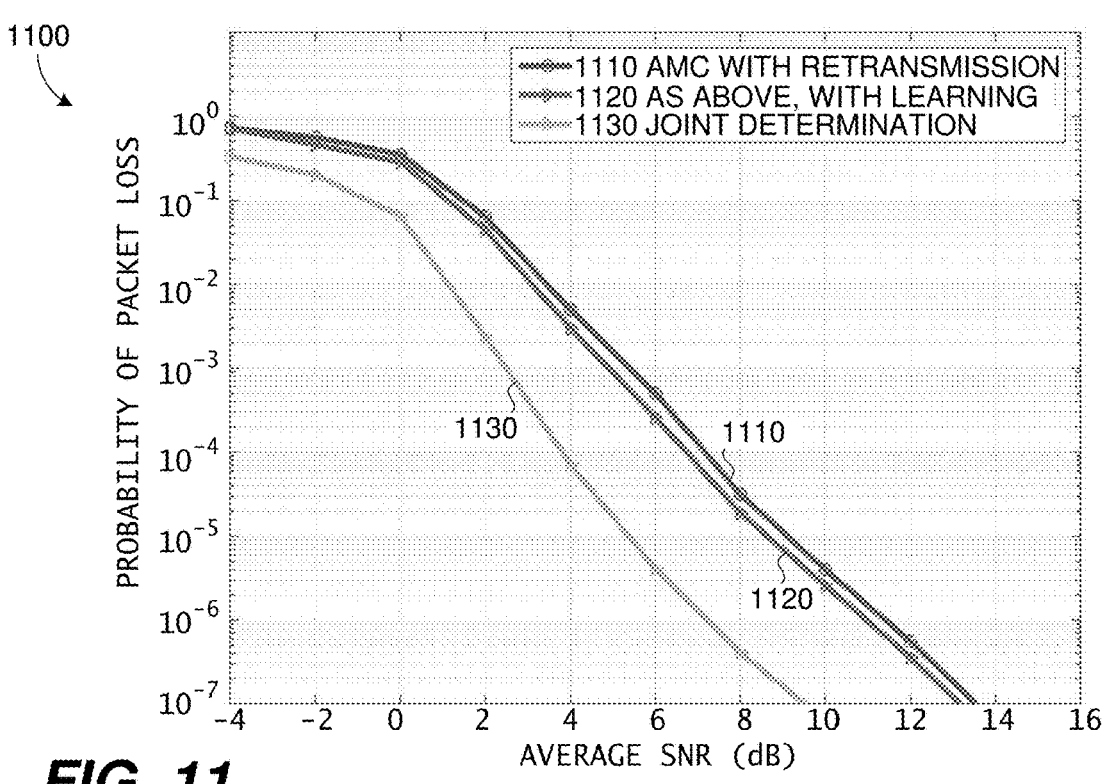
FIG. 11 is a second chart illustrating improved performance achieved with the disclosed technologies.

FIG. 11 is a second chart 1100 illustrating improved packet loss performance achieved with the disclosed technologies. Whereas FIG. 10 showed variation as a function of latency, FIG. 11 compares packet loss rates across a range of SNR values. Graphs 1110, 1120, 1130 model the same schemes as respective graphs 1010, 1020, 1030 of FIG. 10, for a common latency requirement of 1 ms.

Comparison of graphs 1110, 1120 shows that reinforcement learning provides up to about a factor of two reduction in packet loss rate over a wide range of SNR, similar to results of FIG. 10. Again, joint parameter determination as disclosed herein is seen in graph 1130 to provide dramatic improvement: more than ten times reduction in packet loss rate for all SNR above about 1 dB, comparing with graph 1120 (AMC with learning and retransmission), and over twenty times lower packet loss rates compared to graph 1110 (AMC with retransmission).

Alternatively, FIG. 11 can be viewed as demonstrating a gain in SNR. That is, with the disclosed technologies, a given packet loss rate can be achieved with about 3 dB lower SNR than for the comparative schemes of graphs 1110, 1120. This reduction in SNR can variously provide an increase in range, a reduction in transmit power, or increased battery life in a portable device.

Additional Examples

The following are additional examples of the disclosed technologies.

Example 1 is a computer-implemented method, including: for each of a plurality of combinations of (i) data packet size, (ii) channel state information, and (iii) latency requirement, jointly determining respective values of a plurality of transmission parameters including slot size, subcarrier spacing, modulation scheme, and coding rate; acquiring a data packet; obtaining the jointly determined transmission parameter values corresponding to (i) a size of the data packet, (ii) the channel state information of a channel over which the data packet is to be transmitted, and (iii) the latency requirement for the data packet; and causing wireless transmission of the data packet according to the obtained jointly determined transmission parameter values.

Example 2 includes the subject matter of Example 1, and further includes: subsequent to the wireless transmission, causing wireless retransmission of the data packet, wherein elapsed time from the acquiring to the wireless retransmission is within the latency requirement.

Example 3 includes the subject matter of any of Examples 1-2, and further specifies that the jointly determining maximizes reliability subject to the latency requirement.

Example 4 includes the subject matter of any of Examples 1-3, and further includes, in a case where the transmitted data packet is not successfully received within a maximum latency interval, discarding the data packet.

Example 5 includes the subject matter of any of Examples 1-4, and further specifies that the data packet is a first data packet, and the method further comprises: repeating the acquiring, obtaining, and causing for a succession of data packets including the first data packet.

Example 6 includes the subject matter of Example 5, and further specifies that the succession of data packets comprises multiple streams of data.

Example 7 includes the subject matter of Example 6, and further specifies that each of the multiple streams comprises a respective data packet and the data streams are distinguished by one or more of: source component from which the respective data packet is acquired; intended receiver of the respective transmission; respective constraints; or type of the respective data packet.

Example 8 includes the subject matter of any of Examples 1-7, and further specifies that the transmission is performed according to a standard that provides one or more of: flexible subcarrier spacing or flexible slot size.

Example 9 is one or more computer-readable media storing instructions which, when executed by one or more hardware processors, actuate the one or more hardware processors to: acquire a data packet; obtain jointly determined respective values of a plurality of transmission parameters, corresponding to (i) a size of the data packet, (ii) channel state information of a channel over which the transmission is to be performed, and (iii) a latency requirement; and cause wireless transmission of the data packet according to the jointly determined parameter values.

Example 10 includes the subject matter of Example 9, and further specifies that the transmission parameters comprise: a modulation scheme, a coding rate, a slot size, and a subcarrier spacing.

Example 11 includes the subject matter of any of Examples 9-10, and further specifies that the determining is performed by solving a Markov decision process (MDP) problem.

Example 12 includes the subject matter of any of Examples 9-11, and further includes: causing the jointly determined parameter values to be transmitted over a control channel to an intended receiver of the data packet.

Example 13 includes the subject matter of any of Examples 9-12, and further includes: causing retransmission of the data packet, wherein the transmission and retransmission both occur within a latency window of the data packet.

Example 14 is an apparatus, including: a radio transmitter; one or more hardware processors with memory coupled thereto; computer-readable media storing instructions which, when executed by the one or more hardware processors cause the hardware processors to: acquire a data packet, and obtain jointly determined values of a plurality of transmission parameters, corresponding to (i) a size of the data packet, (ii) channel state information of a channel over which the transmission is to be performed, and (iii) a latency requirement; and cause the apparatus to transmit the data packet to a receiver according to the jointly determined values.

Example 15 is an IoT device including the apparatus of Example 14.

Example 16 is a motor vehicle including the apparatus of Example 14.

Example 17 is an industrial automation system including the apparatus of Example 14.

Example 18 includes the subject matter of any of Examples 14-17, and further includes: a sensor coupled to the one or more hardware processors, the sensor sourcing signal data included in the data packet.

Example 19 is a system including the apparatus of claim 14 and the receiver.

Example 20 includes the subject matter of Example 19, and further specifies that the receiver is configured to transmit the channel state information to the apparatus, and transmit an acknowledgement to the apparatus indicating whether the data packet was successfully received.

A Generalized Computer Environment

Figure 12:
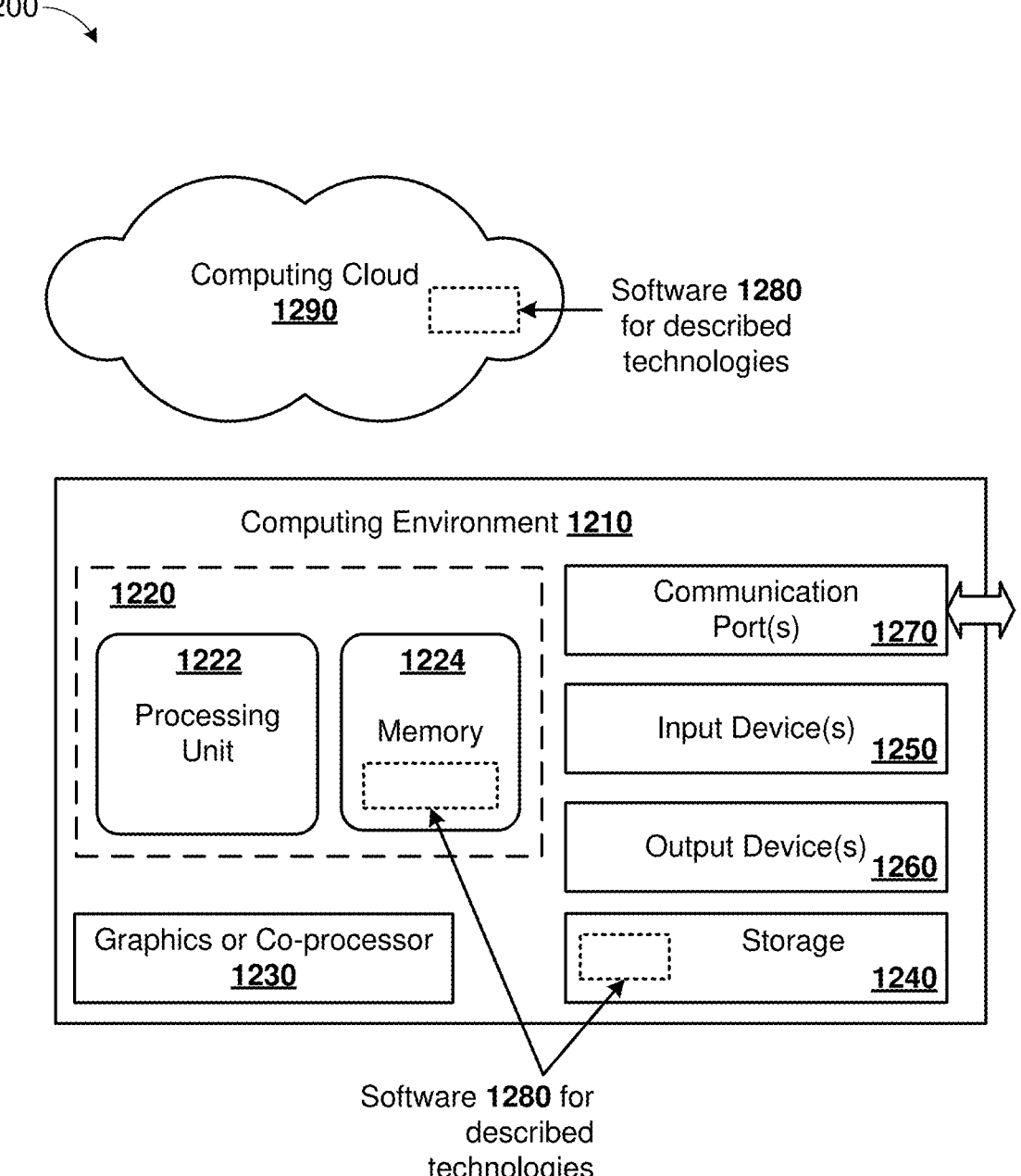
FIG. 12 is a diagram schematically depicting a computing environment suitable for implementation of disclosed technologies.

FIG. 12 illustrates a generalized example of a suitable computing system 1200 in which described examples, techniques, and technologies, including construction, deployment, operation, and maintenance of software for wireless communication, or transmission planning therefor, can be implemented according to disclosed technologies. The computing system 1200 is not intended to suggest any limitation as to scope of use or functionality of the present disclosure, as the innovations can be implemented in diverse general-purpose or special-purpose computing systems.

With reference to FIG. 12, computing environment 1210 includes one or more processing units 1222 and memory 1224. In FIG. 12, this basic configuration 1220 is included within a dashed line. Processing unit 1222 executes computer-executable instructions, such as for implementing any of the methods or objects described herein for determining transmission parameter values, transmitting or receiving signals, or associated tasks; or various other architectures, software components, handlers, managers, modules, or services described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. The memory 1224 can also store metadata or configuration data associated with applicable standards or protocols, available data or control channels, constraints, error correction, packet framing, or an implemented parameter determination technique; other configuration data, data structures including data tables, working tables, change logs, output structures, data values, indices, or flags, as well as other operational data.

A computing system 1210 can have additional features, such as one or more of storage 1240, input components 1250, output components 1260, or communication ports 1270. An interconnection mechanism (not shown) such as a bus, controller, or network interconnects the hardware components of the computing environment 1210. Typically, operating system software (not shown) provides an operating environment for other software executing in the computing environment 1210, and coordinates activities of the hardware and software components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein.

The input component(s) 1250 can be a mechanical, touch-sensing, or proximity-sensing input component such as a keyboard, mouse, pen, touchscreen, trackball, a voice input component, a scanning component, or another component that provides input to the computing environment 1210. The output component(s) 1260 can be a display, printer, speaker, optical disk writer, or another component that provides output from the computing environment 1210.

The communication port(s) 1270 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

Particularly, communication port(s) 1270 can provide transmission or reception of data in communication slots as described herein, or can be coupled to radios or antennas. In various examples, input component(s) 1250 or output component(s) 1260 can also be interface cards, radios, or antennas.

In some examples, computer system 1200 can also include a computing cloud 1290 in which instructions implementing all or a portion of the disclosed technologies are executed. Any combination of memory 1224, storage 1240, and computing cloud 1290 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. which perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Occasionally, the term "computer" is used to refer to a computing system. Virtual processors, virtual hardware, and virtualized devices are ultimately embodied in a hardware processor or another form of physical computer hardware, and thus include both software associated with virtualization and underlying hardware.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and do not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods.

Additionally, the description sometimes uses terms like "acknowledge," "actuate," "analyze," "apply," "configure," "convert," "correct," "decode," "demodulate," "demultiplex," "detect," "acquire," "decide," "determine," "discard," "encode," "estimate," "evaluate," "generate," "identify," "indicate," "modulate," "multiplex," "negotiate," "obtain," "receive," "retransmit," "recover," "sense," "store," "transform," "transmit," or "use" to indicate computer operations in a computer system. These terms denote actual operations that are performed by a computer or controlled by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In some examples, parameter values, performance measures, or other entities are referred to as "optimal," "lowest," "best," "maximum," or the like. Such descriptions indicate that a selection among multiple alternatives can be made, and such selection need not be better, smaller, or otherwise preferable to other alternatives not considered. Similarly, terms such as "optimize" or "maximize" indicate that multiple alternatives are considered, but do not imply that all possible alternatives are considered.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The terms computer-readable media and computer-readable storage media do not include signals and carrier waves. In addition, the terms computer-readable media and computer-readable storage media do not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed technologies may be applied, it should be recognized that the illustrated embodiments are only preferred examples and should not be taken as limiting the scope of the claims. We therefore claim all that comes within the scope and spirit of these claims.

We claim:

1. A computer-implemented method comprising:

for each of a plurality of combinations of (i) data packet size, (ii) channel state information, and (iii) latency requirement:

jointly determining values of a plurality of transmission parameters including slot size, subcarrier spacing, modulation scheme, and coding rate;

acquiring a data packet;

for a given combination, among the plurality of combinations, having (i) a size of the data packet, (ii) the channel state information of a channel over which the data packet is to be transmitted, and (iii) the latency requirement for the data packet:

obtaining the respective jointly determined values of the plurality of transmission parameters; and causing wireless transmission of the data packet according to the respective jointly determined values of the plurality of transmission parameters; and subsequent to the wireless transmission, causing wireless retransmission of the data packet, wherein elapsed time from the acquiring to the wireless retransmission is within the latency requirement.

2. The computer-implemented method of claim 1, wherein the jointly determining maximizes reliability subject to the latency requirement.

3. The computer-implemented method of claim 1, further comprising, in a case where the transmitted data packet is not successfully received within a maximum latency interval, discarding the data packet.

4. The computer-implemented method of claim 1, wherein the data packet is a first data packet, and the method further comprises:

repeating the acquiring, obtaining, and causing for a succession of data packets including the first data packet.

5. The computer-implemented method of claim 4, wherein the succession of data packets originates from multiple streams of data.

6. The computer-implemented method of claim 1, wherein the wireless transmission is performed according to a standard that provides one or more of: flexible subcarrier spacing or flexible slot size.

7. One or more computer-readable media storing instructions which, when executed by one or more hardware processors, actuate the one or more hardware processors to:

acquire a data packet;

obtain jointly determined values of a plurality of transmission parameters, corresponding to (i) a size of the data packet, (ii) channel state information of a channel over which transmission of the data packet is to be performed, and (iii) a latency requirement;

wherein the values are jointly determined by solving a Markov decision process (MDP) problem; and cause wireless transmission of the data packet according to the jointly determined parameter values.

8. The one or more computer-readable media of claim 7, wherein the transmission parameters comprise: a modulation scheme, a coding rate, a slot size, and a subcarrier spacing.

9. The one or more computer-readable media of claim 7, further comprising:

causing the jointly determined parameter values to be transmitted over a control channel to an intended receiver of the data packet.

10. The one or more computer-readable media of claim 7, further comprising:

causing retransmission of the data packet, wherein the wireless transmission and the retransmission both occur within a latency window of the data packet.

11. An apparatus comprising:

a radio transmitter;

one or more hardware processors with memory coupled thereto;

computer-readable media storing instructions which, when executed by the one or more hardware processors:

cause the one or more hardware processors to:

acquire a data packet; and obtain jointly determined values of a plurality of transmission parameters, corresponding to (i) a size of the data packet, (ii) channel state information of a channel over which transmission of the data packet is to be performed, and (iii) a latency requirement;

wherein the values are jointly determined by solving a Markov decision process (MDP) problem; and cause the apparatus to:

transmit the data packet to a receiver according to the jointly determined values.

12. An Internet-of-Things (IoT) device comprising the apparatus of claim 11.

13. A motor vehicle comprising the apparatus of claim 11.

14. An industrial automation system comprising the apparatus of claim 11.

15. The apparatus of claim 11, further comprising:

a sensor coupled to the one or more hardware processors, the sensor sourcing signal data included in the data packet.

16. A system comprising:

the apparatus of claim 11; and the receiver.

17. The system of claim 16, wherein the receiver is configured to:

transmit the channel state information to the apparatus; and transmit an acknowledgement to the apparatus indicating whether the data packet was successfully received.

18. The computer-implemented method of claim 4, wherein the succession of data packets further includes a second data packet, the first data packet and the second data packet being distinct data packets respectively originating from distinct streams of data, and wherein:

the first and second data packets are acquired from distinct source components;

the first and second data packets are wirelessly transmitted to distinct intended receivers;

the first and second data packets have distinct transmission constraints; or the first and second data packets are of distinct data packet types.

\* \* \* \* \*